US006961571B1

(12) United States Patent
Rune et al.

(10) Patent No.: US 6,961,571 B1
(45) Date of Patent: Nov. 1, 2005

(54) RELOCATION OF SERVING RADIO NETWORK CONTROLLER WITH SIGNALING OF LINKING OF DEDICATED TRANSPORT CHANNELS

(75) Inventors: Göran Christersson Rune, Linköping (SE); Alain Maupin, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/543,536

(22) Filed: Apr. 5, 2000

(51) Int. Cl.[7] .............................................. H04Q 7/20
(52) U.S. Cl. ...................... 455/442; 455/436; 455/445; 370/331
(58) Field of Search ............................... 455/442, 445, 455/432, 435, 436, 426, 432.1; 370/331, 370/355, 332, 400, 395

(56) References Cited

U.S. PATENT DOCUMENTS 6,347,091 B1 * 2/2002 Wallentin et al. ........... 370/437
6,438,370 B1 * 8/2002 Einola et al. .............. 455/422
6,466,556 B1 * 10/2002 Boudreaux .................. 370/331
6,618,589 B1 * 9/2003 Rune et al. ................. 455/433

FOREIGN PATENT DOCUMENTS

WO 99/39528 A1 8/1999
WO 99/51051 A2 10/1999
WO 99/53668 A2 10/1999
WO 01/39534 A1 5/2001

OTHER PUBLICATIONS

U.S. Appl. No. 09/035,788, filed Mar. 6, 1998, entitled Telecommunications Inter-Exchange Measurement Transfer.

U.S. Appl. No. 09/035,821, filed Mar. 6, 1998, entitled "Telecommunications Inter-Exchange Congestion Control".

* cited by examiner

*Primary Examiner*—Tilahun Gesesse
(74) *Attorney, Agent, or Firm*—Nixon & Vanderhye, P.C.

(57) ABSTRACT

In a radio access network, a SRNC relocation procedure (100, 100') is performed for relocating a role of a serving radio network controller (SRNC) for a telecommunications service involving a user equipment unit (UE) from a first radio network controller (26$_1$) to a second radio network controller (26$_2$). In accordance various modes of the SRNC relocation procedure, the first radio network controller signals to the second radio network controller information for linking transport channels utilized for the service with a radio access bearer (RAB) for the service. In a first mode of the invention, the signaling links a dedicated transport channel (DCH) utilized for the service with a radio access bearer (RAB) for the service. In second through fourth modes of the invention, during the SRNC relocation procedure the signaling links uplink and downlink transport channel (TrCH) IDs with the radio access bearer (RAB) identifier. Preferably but not exclusively, in accordance with the SRNC relocation procedure the signaling of the information for linking the transport channels with the radio access bearer (RAB) for the service occurs at a time when a user equipment unit (UE) involved in the service is not changing cells, with the signaling being routed via a core network. Advantageously, the SRNC relocation procedure of the invention allows the target SRNC node to utilize, after the relocation, the same transport channels as before the location, without having to make new allocations of transport channels.

50 Claims, 19 Drawing Sheets

RELOCATION OF SERVING RADIO NETWORK CONTROLLER WITH SIGNALING OF LINKING OF DEDICATED TRANSPORT CHANNELS

BACKGROUND

1. Field of the Invention

The present invention pertains to telecommunications, and particularly to the relocation of a Serving Radio Network Controller in a Radio Access Network.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks)

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface". In some instances, a connection involves both a Serving or Source RNC (SRNC) and a target or drift RNC (DRNC), with the SRNC controlling the connection but with one or more diversity legs of the connection being handling by the DRNC (see, in this regard, U.S. patent application Ser. No. 09/035,821 filed Mar. 6, 1998, entitled "Telecommunications Inter-Exchange Measurement Transfer"; and U.S. patent application Ser. No. 09/035,788 filed Mar. 6, 1998, entitled "Telecommunications Inter-Exchange Congestion Control", both of which are incorporated herein by reference). The interface between a SRNC and a DRNC is termed the "Iur" interface.

In the Universal Mobile Telecommunications (UMTS), a service is identified on a non-access stratum level of the UMTS architecture by a Non-Assess Stratum (NAS) Service Identifier (NAS Service ID). On the access stratum level of the UMTS architecture, each service is identified by a radio access bearer (RAB) identifier (RAB ID) on the Iu interface and by one or more radio bearer (RB) identifiers (RB IDs) on the radio interface (e.g,. the air interface). Each NAS Service is thus linked to one radio access bearer (RAB), and each radio access bearer (RAB) is linked to one or more radio bearers (RBs). One or more radio bearers (RBs) are linked to one transport channel, e.g., to one Dedicated Transport Channel (DCH) on the Iur, Iub, and radio interfaces. Each DCH is thus linked to one or more radio bearers (RBs). Consequentially, each radio access bearer (RAB) is linked to one or more DCHs.

A Dedicated Transport Channel (DCH) is identified by a DCH ID on the Iur and Iub interfaces. The DCH ID used on the Iur and Iub interfaces is not used on the radio interface. Instead, a Transport Channel (TrCH) identifier is used over the radio interface to identify the transport channel on the radio interface. The serving RNC (SRNC) and the UE know this Transport Channel (TrCH) identifier (in the same way as they know the RB ID), but the Transport Channel (TrCH) identifier is not known to the DRNC or to the Base Station.

A project known as the Third Generation Partnership Project (3GPP) has undertaken to evolve further the UTRAN and GSM-based radio access network technologies. The 3GPP anticipates a situation in which the role of a Serving RNC (SRNC) will be relocated from a first RNC to another RNC, such as an RNC which previously served as a Drift RNC (DRNC). In connection with such relocation, the 3GPP proposes to signal from the first RNC (e.g., the old SRNC) to the second RNC (e.g., new SRNC) certain linking information, and specifically to signal information which links the radio access bearer (RAB) IDs and their radio bearer (RB) IDs. However, in accordance with this 3GPP proposal, the new SRNC must still guess which transport channels would correspond to the radio bearers utilized.

What is needed, therefore, and an object of the present invention, is a technique for enabling the new SRNC to link transport channels with radio bearers.

BRIEF SUMMARY OF THE INVENTION

In a radio access network, a SRNC relocation procedure is performed for relocating a role of a serving radio network controller (SRNC) for a telecommunications service involving a user equipment unit (UE) from a first radio network controller to a second radio network controller. In accordance various modes of the SRNC relocation procedure, the first radio network controller signals to the second radio network controller information for linking transport channels utilized for the service with a radio access bearer (RAB) for the service.

In a first mode of the invention, the signaling links a dedicated transport channel (DCH) utilized for the service with a radio access bearer (RAB) for the service. In second through fourth modes of the invention, during the SRNC relocation procedure the signaling links uplink and downlink transport channel (TrCH) IDs with the radio access bearer (RAB) identifier. In a third mode, the linking of the uplink and downlink transport channel (TrCH) IDs with the radio access bearer (RAB) identifier occurs over the Iu interface, while linking of the TrCH IDs and the DCH IDs occurs over the Iur interface. In a fourth mode, the linking of the uplink and downlink transport channel (TrCH) IDs with the radio access bearer (RAB) identifier occurs over the Iu interface, and there is no need to transmit DCH IDs in view of the target SRNC already knowing the uplink and downlink transport channel (TrCH) IDs, which have replaced the DCH IDs on the Iur and Iub interfaces.

Preferably but not exclusively, in accordance with the SRNC relocation procedure the signaling of the information for linking the transport channels with the radio access bearer (RAB) for the service occurs at a time when a user equipment unit (UE) involved in the service is not changing cells, with the signaling being routed via a core network.

Advantageously, the SRNC relocation procedure of the invention allows the target SRNC node to utilize, after the relocation, the same transport channels as before the location, without having to make new allocations of transport channels.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
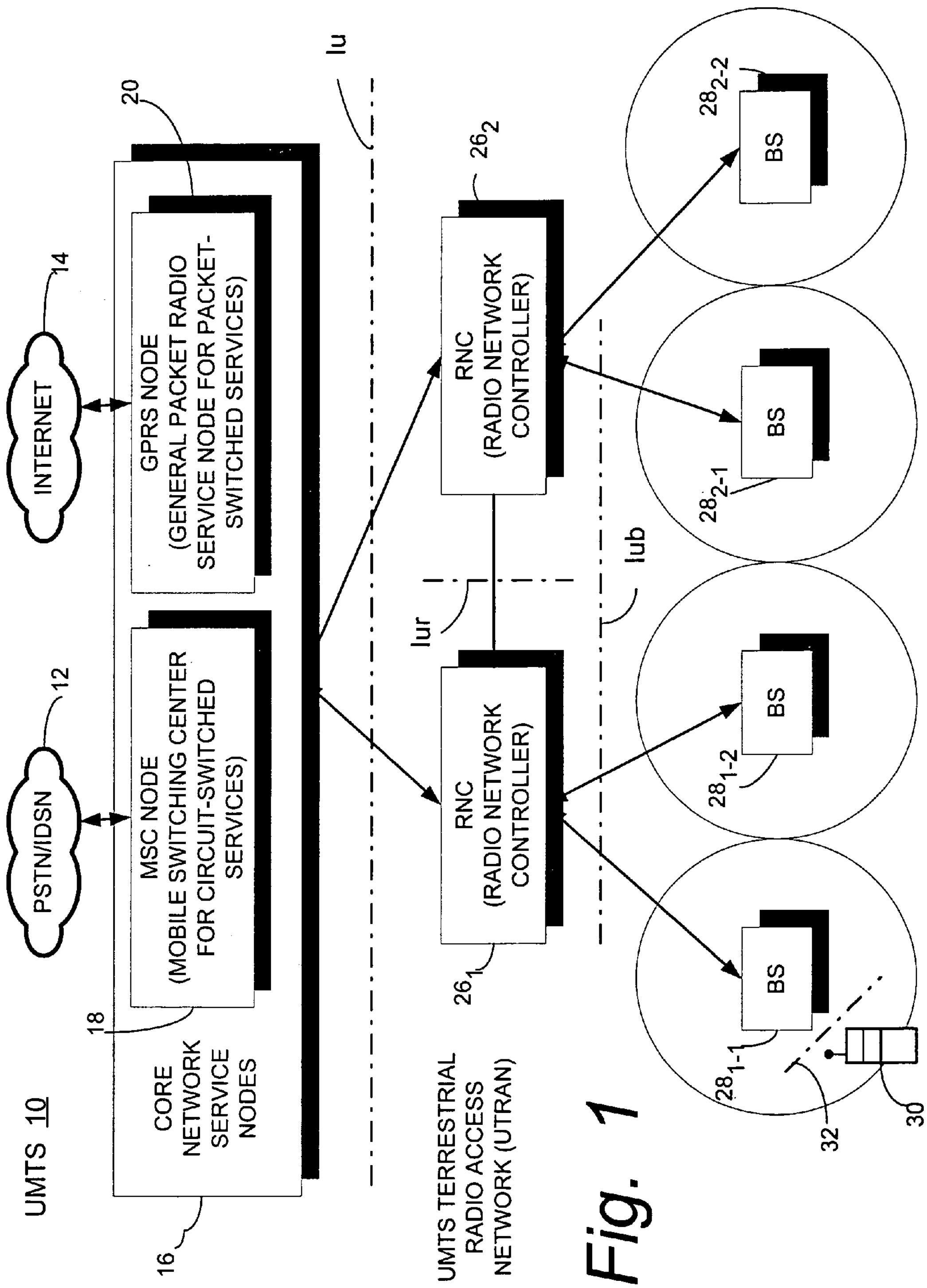
FIG. 1 is diagrammatic view of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $\mathbf{26}_1$ and RNC$\mathbf{26}_2$. Each RNC 26 is connected to a plurality of base stations (BS) 28. For example, and again for sake of simplicity, two base station nodes are shown connected to each RNC 26. In this regard, RNC $\mathbf{26}_1$ serves base station $\mathbf{28}_{1\text{-}1}$ and base station $\mathbf{28}_{1\text{-}2}$, while RNC $\mathbf{26}_2$ serves base station $\mathbf{28}_{2\text{-}1}$ and base station $\mathbf{28}_{2\text{-}2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24.

A user equipment unit (UE), such as user equipment unit (UE) 30 shown in FIG. 1, communicates with one or more base stations (BS) 28 over a radio or air interface 32. Each of the radio interface 32, the Iu interface, the Iub interface, and the Iur interface are shown by dash-dotted lines in FIG. 1.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels (TCH) may be allocated to carry substantive call communications with a user equipment unit (UE).

The present invention particularly concerns a situation in a cellular radio communication network in which the role of a serving radio network controller (SRNC) is transferred from one radio network controller to another radio network controller. In terms of "role", those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE).

When a connection between the radio access network (RAN) and user equipment unit (UE) is being established, the radio access network (RAN) decides which RNC is to be the serving RNC (SRNC) and, if needed, which RNC is to be a drift RNC (DRNC). Normally, the RNC that controls the cell where the user equipment unit (UE) is located when the connection is first established is initially selected as the serving RNC (SRNC). As the user equipment unit (UE) moves, the connection is maintained by establishing radio communication branches or legs via new cells, possibly cells controlled by other RNCs. Those other RNCs become drift RNCs (DRNC) for RAN-UE connection.

Figure 1A:
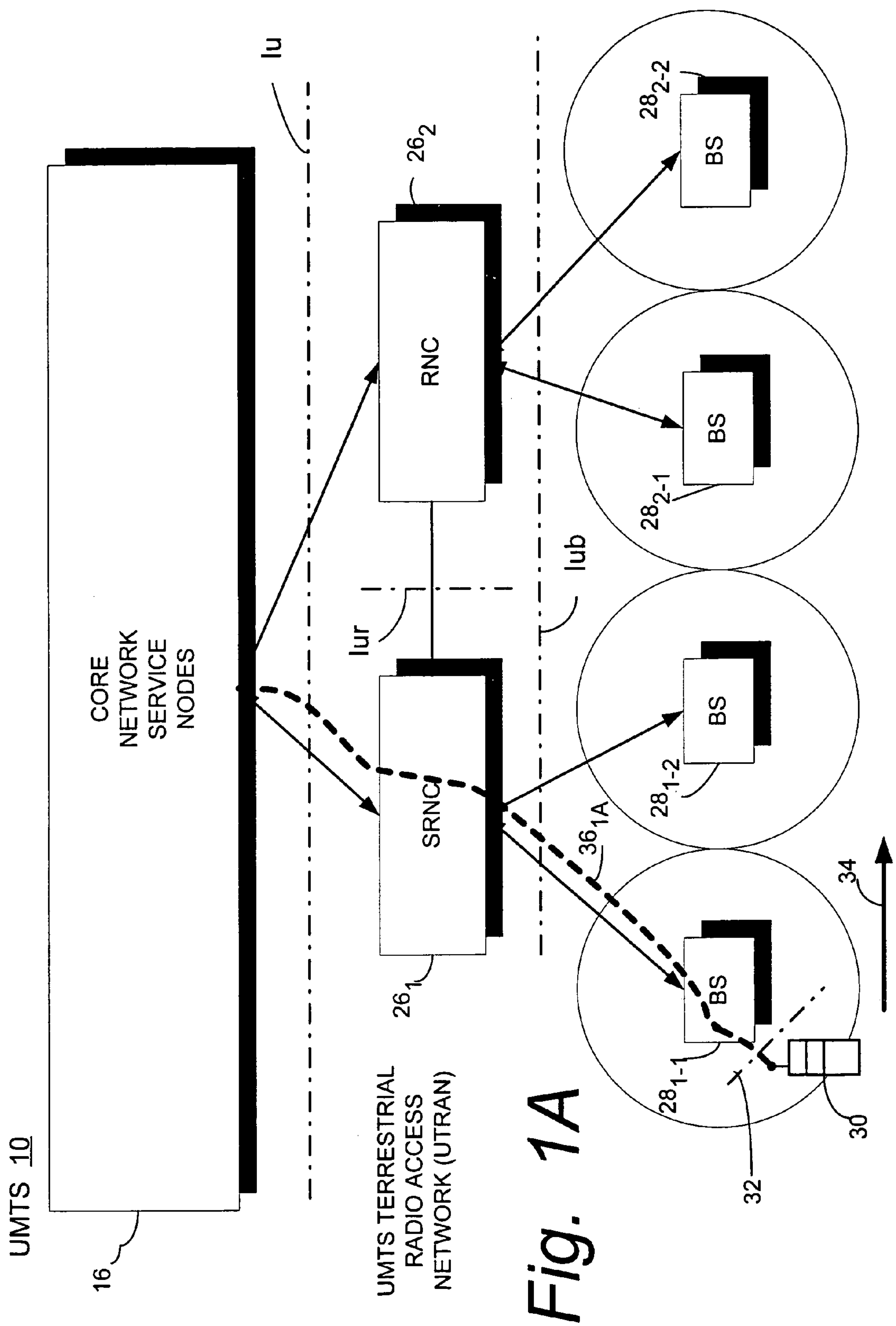
FIG. 1A is a diagrammatic view illustrating an example assignment of RNC roles for the system of FIG. 1 at setup of a connection with a user equipment unit (UE).

To illustrate the foregoing, and as a prelude to an explanation of the present invention, reference is made to the situation shown in FIG. 1A. FIG. 1A shows an example of RNC role assignment for user equipment unit (UE) 30 at initial setup of a connection involving user equipment unit (UE) 30. In FIG. 1A, radio network controller (RNC) $\mathbf{26}_1$ acts as the serving RNC (SRNC) for the connection with user equipment unit (UE) 30, since user equipment unit (UE) 30 is in the cell controlled by base station (BS) $\mathbf{28}_{1\text{-}1}$. The connection with user equipment unit (UE) 30 in FIG. 1A is shown by the broken line $\mathbf{36}_{1A}$ (which extends from core network 16, through radio network controller (RNC) $\mathbf{26}_1$, and base station (BS) $\mathbf{28}_{1\text{-}1}$ to user equipment unit (UE) 30).

Figure 1B:
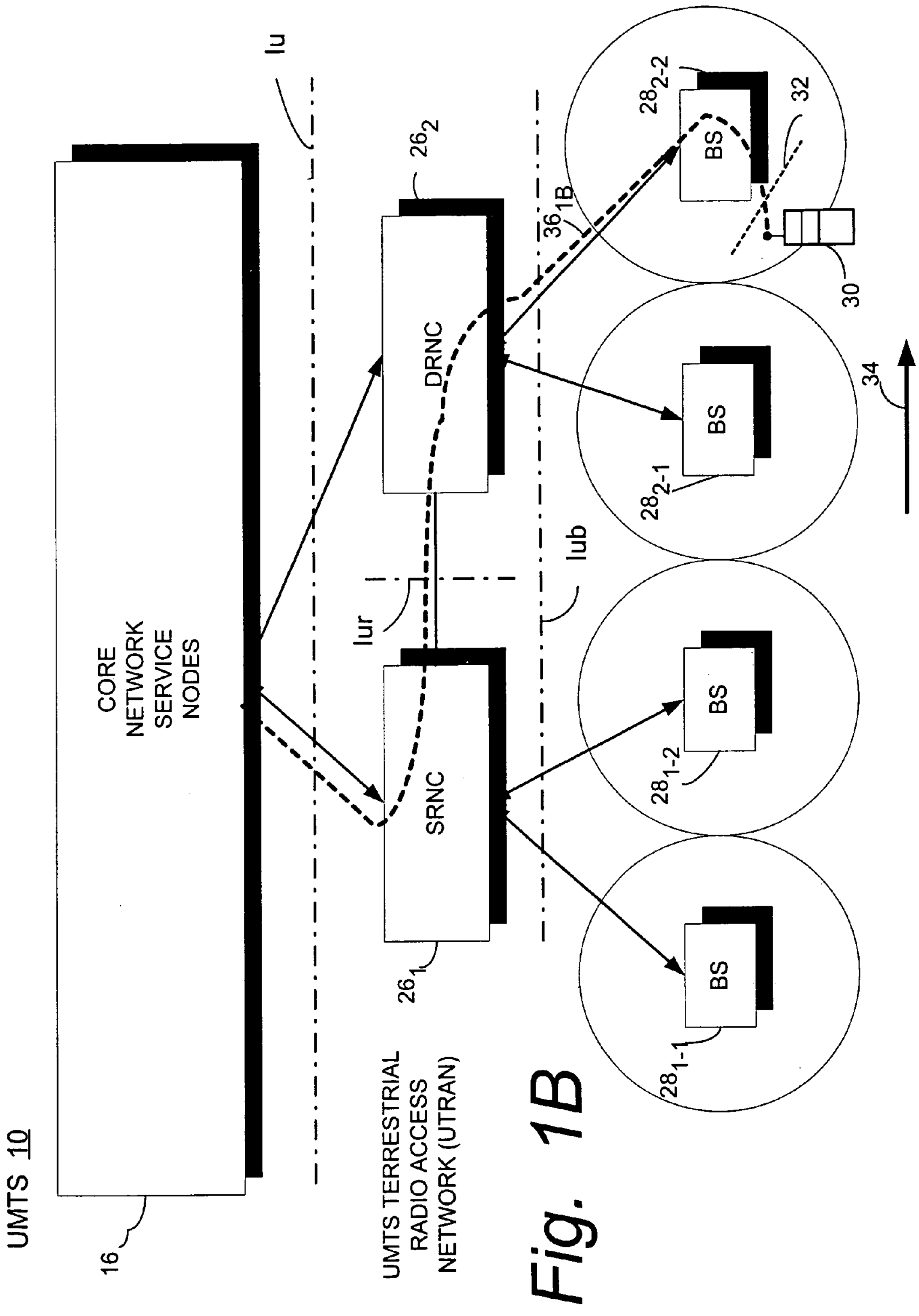
FIG. 1B is a diagrammatic view illustrating an example assignment of RNC roles after successive handovers of the connection with a user equipment unit (UE).

Suppose that user equipment unit (UE) 30 travels in the rightward direction indicated by arrow 34 in FIG. 1A, eventually leaving the cell controlled by base station (BS) $\mathbf{28}_{1\text{-}1}$ and traveling successively through the cells controlled by respective base stations $\mathbf{28}_{1\text{-}2}$, $\mathbf{28}_{2\text{-}1}$, and $\mathbf{28}_{2\text{-}2}$. As user equipment unit (UE) 30 enters a new cell, a handover occurs. The time at which user equipment unit (UE) 30 arrives at the cell controlled by base station $\mathbf{28}_{2\text{-}2}$ is illustrated in FIG. 1B. At such time shown in FIG. 1B, radio network controller (RNC) $26_1$ still acts as the serving RNC (SRNC) for the connection to user equipment unit (UE) 30, while radio network controller (RNC) $26_2$ acts as the drift RNC (DRNC). In other words, radio network controller (RNC) $26_1$ still has control of the connection with user equipment unit (UE) 30, while radio network controller (RNC) $26_2$ supplies resources for the connection with respect to the cell in which user equipment unit (UE) 30 currently resides. The connection with user equipment unit (UE) 30 in FIG. 1B is shown by the broken line $36_{1B}$.

In certain situations it its advantageous to transfer control of a particular UE connection from one RNC to another RNC. A relocate function/procedure is provided to effect this transfer of control. This is a general function/procedure covering UMTS internal relocations (e.g., relocation of SNRC within the UMTS) as well as relocations to other systems (e.g., from UMTS to GSM, for example). This invention primarily involves relocations within a system (such as UMTS, for example). The invention is especially advantageous to relocations within systems for which there is no support of RNC-RNC communication between the involved RNCs (e.g., no Iur interface). However, the invention is also applicable to other situations, such as (for example) (1) when an Iur interface exists but there is no support on the concerned Iur interface for communication on dedicated channels (DCHs), or (2) although the Iur interface exists, it may be optimal for transmission efficiency of the network not to use the Iur interface for relocation purposes (e.g., a better situation results after the location). Thus, in one mode of the present invention, the relocation function/procedure is primarily implemented using the Iu interface.

Figure 2A:
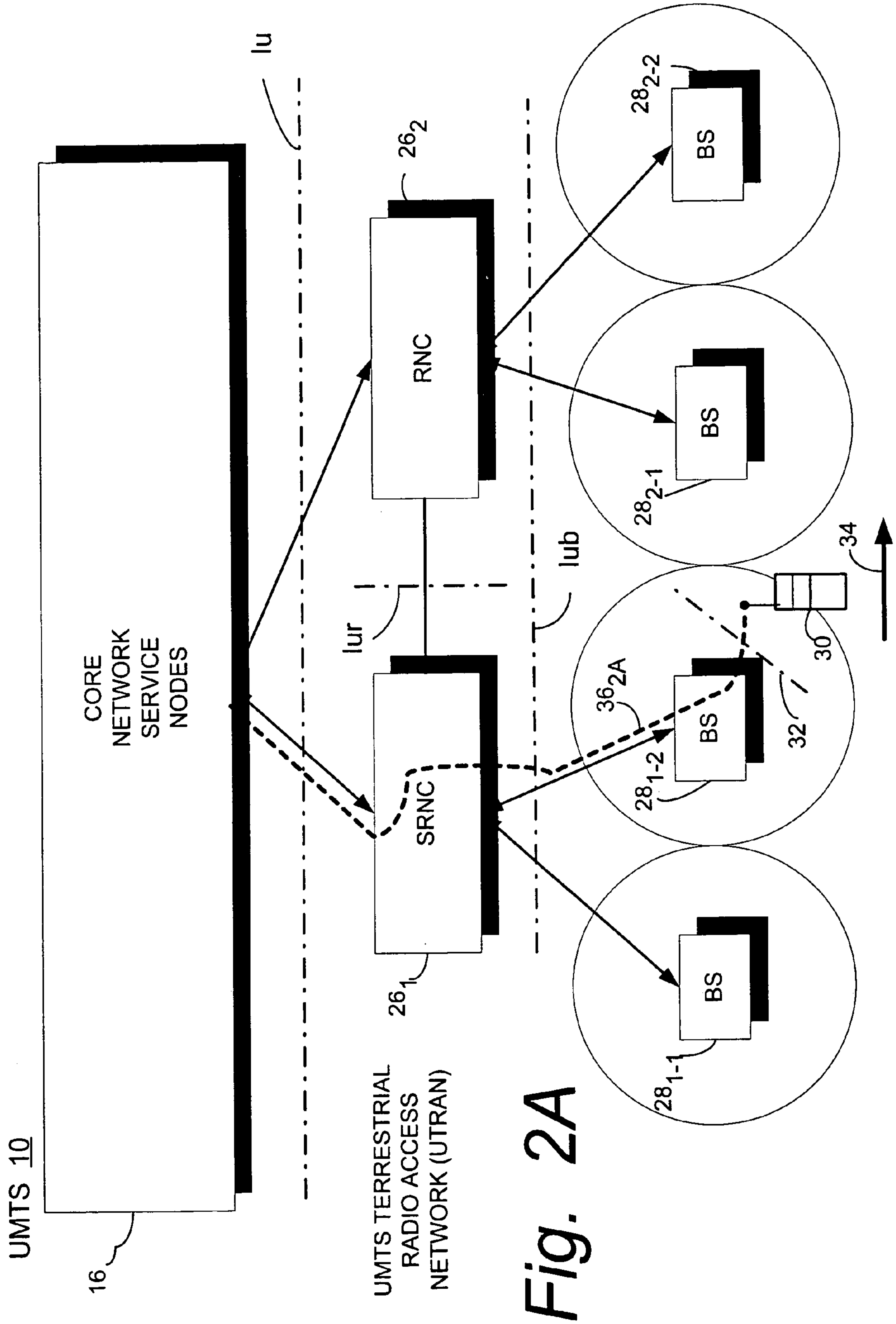
FIG. 2A is a diagrammatic view illustrating an example assignment of RNC roles before relocation with user equipment unit (UE) involvement.
Figure 2B:
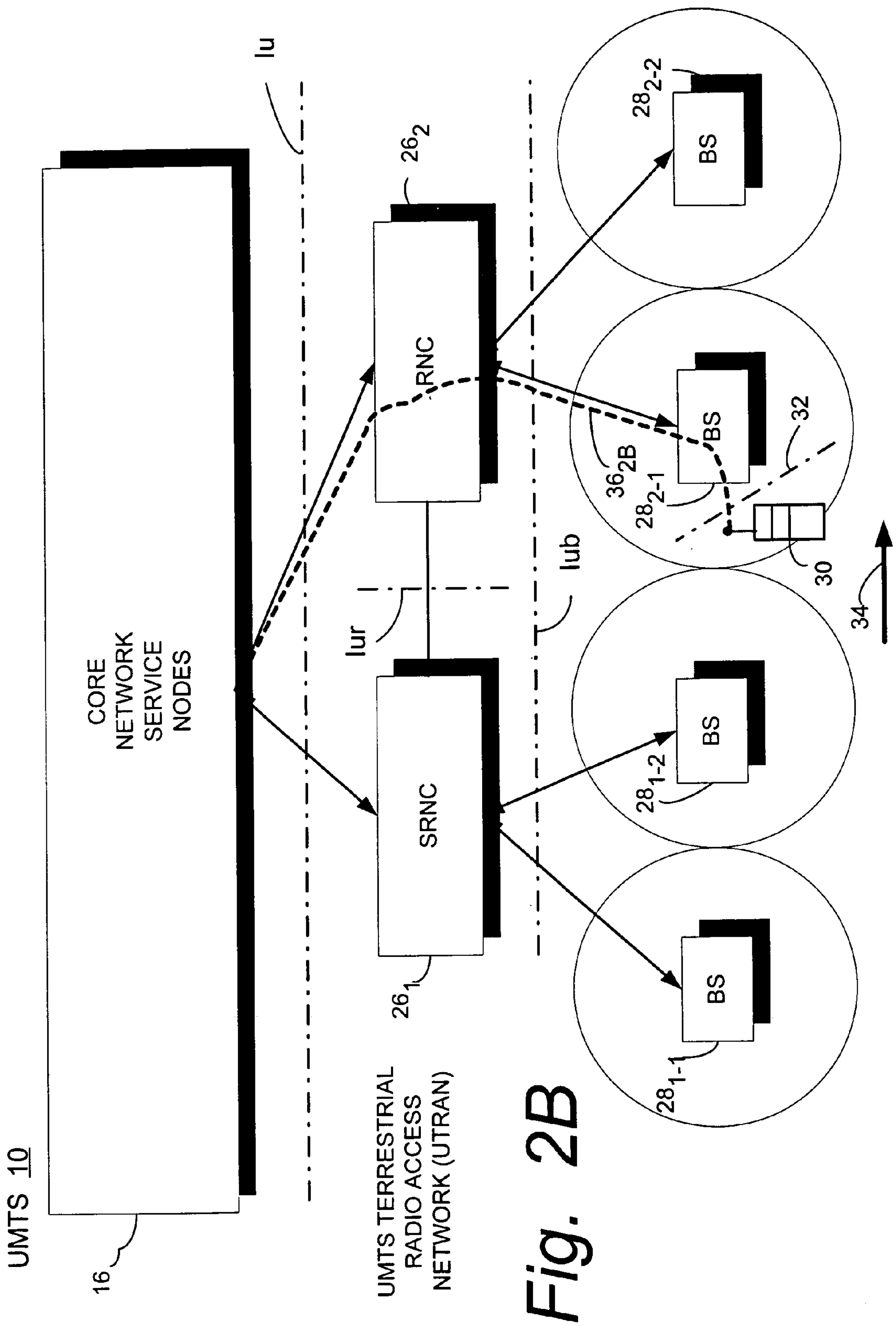
FIG. 2B is a diagrammatic view illustrating an example assignment of RNC roles after relocation with user equipment unit (UE) involvement.
Figure 3A:
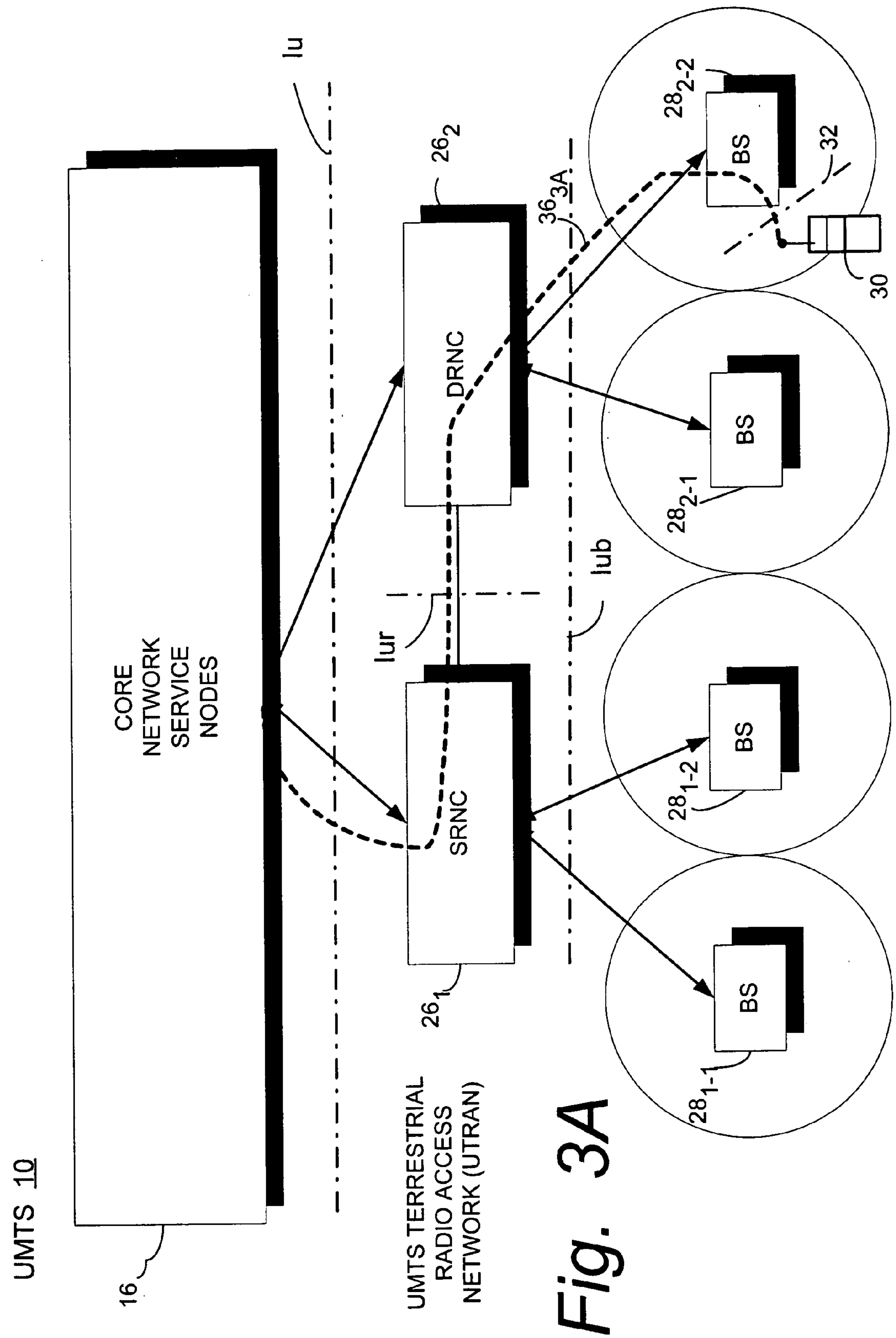
FIG. 3A is a diagrammatic view illustrating an example assignment of RNC roles before relocation without user equipment unit (UE) involvement.
Figure 3B:
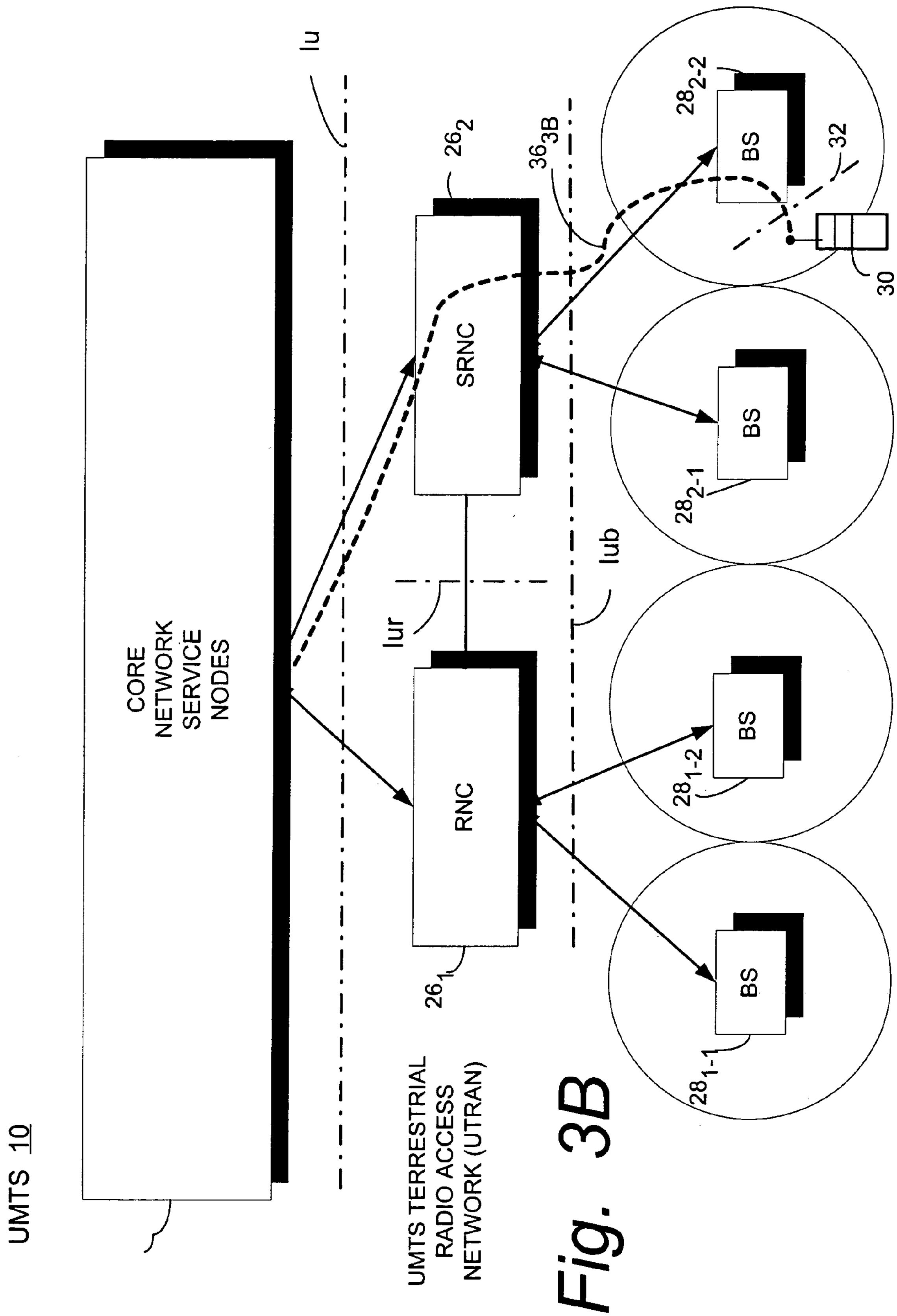
FIG. 3B is a diagrammatic view an example assignment of RNC roles after relocation without user equipment unit (UE) involvement.

In general, there are two types of relocations. The first type of relocation, illustrated generally by FIG. 2A and FIG. 2B, is relocation with user equipment unit (UE) involvement. The second type of relocation, illustrated generally by FIG. 3A and FIG. 3B, is relocation without user equipment unit (UE) involvement. While, as explained subsequently, this invention is especially applicable to relocation without user equipment unit (UE) involvement, the present invention is useful in both general scenarios.

In the general case of relocation with user equipment unit (UE) involvement, illustrated in FIG. 2A and FIG. 2B, the serving RNC (SRNC) role is transferred from one RNC to another RNC at the same time as the radio interface communication is handed over from once cell to another cell. After the relocation, the only remaining nodes are the core network node(s) and the user equipment unit (UE). The serving RNC (SRNC) is replaced by another RNC and the base stations are placed by other base stations served by the replacing RNC. Any formerly involved DRNC is no longer involved.

FIG. 2A shows a connection $36_{2A}$ with user equipment unit (UE) 30 at a time when user equipment unit (UE) 30 is in a cell controlled by base station (BS) $28_{1\text{-}2}$, and before relocation with user equipment unit (UE) involvement. The serving RNC (SRNC) is radio network controller (RNC) $26_1$. It so happens that, at the time shown in FIG. 2A, no drift RNC (DRNC) is involved. A drift RNC (DRNC) could be involved before a relocation with user equipment unit (UE) involvement (but, for sake of simplicity, such is not illustrated in FIG. 2A). A drift RNC (DRNC) is normally not involved after relocation with user equipment unit (UE) involvement, even though it could (but, for sake of simplicity, such is not illustrated in FIG. 2A).

For simplicity, in FIG. 2A (as well as other figures) there is only one base station communicating with user equipment unit (UE) 30. Yet those skilled in the art will understand such is typically not the case, as there may be more than one base station in radio contact with user equipment unit (UE) 30 for, e.g., diversity purposes. However, since the relocation of the present invention is applicable regardless of whether one or plural base stations are in communication with the user equipment unit (UE) 30, for simplicity only one such base station is shown.

Suppose that user equipment unit (UE) 30 moves in the direction of arrow 34 from the cell controlled by base station (BS) $28_{1\text{-}2}$ to the cell controlled by base station (BS) $28_{2\text{-}1}$ (in the manner shown in FIG. 2B). Suppose further that in such move the role of SNRC is transferred from radio network controller (RNC) $26_1$ to radio network controller (RNC) $26_2$ at the same time as the radio interface communication is handed over from the cell controlled by base station (BS) $28_{1\text{-}2}$ to the cell controlled by base station (BS) $28_{2\text{-}1}$. In other words, an SRNC relocation with user equipment unit (UE) involvement occurs as user equipment unit (UE) 30 transitions between cells. FIG. 2B thus shows connection $36_{2B}$ with user equipment unit (UE) 30 after the relocation with user equipment unit (UE) involvement.

In the general case of relocation without user equipment unit (UE) involvement, illustrated in FIG. 3A and FIG. 3B, the serving RNC (SRNC) role is transferred from one RNC to another RNC without the user equipment unit (UE) changing cell for radio interface communication. After the relocation the remaining nodes are the core network nodes, the RNC which takes over the serving RNC (SRNC) role, the base stations with which the user equipment unit (UE) has radio contact, and the user equipment unit (UE). FIG. 3A shows the RNC role assignment before a relocation without user equipment unit (UE) involvement, with radio network controller (RNC) $26_1$ being the serving RNC (SRNC) and having control of connection $36_{3A}$. In FIG. 3A, radio network controller (RNC) $26_2$ serves as the drift RNC (DRNC). FIG. 3B, on the other hand, shows the RNC role assignment after a relocation without user equipment unit (UE) involvement, with radio network controller (RNC) $26_2$ being the serving RNC (SRNC) which handles connection $36_{3B}$.

Attention will eventually focus on how the present invention performs the relocation without user equipment unit (UE) involvement in the example situation shown in FIG. 3A and FIG. 3B. But before doing so, further detail is provided concerning establishment of a telecommunications service for which relocation can be required. This description is provided in the context of a description of FIG. 4A.

Figure 4A:
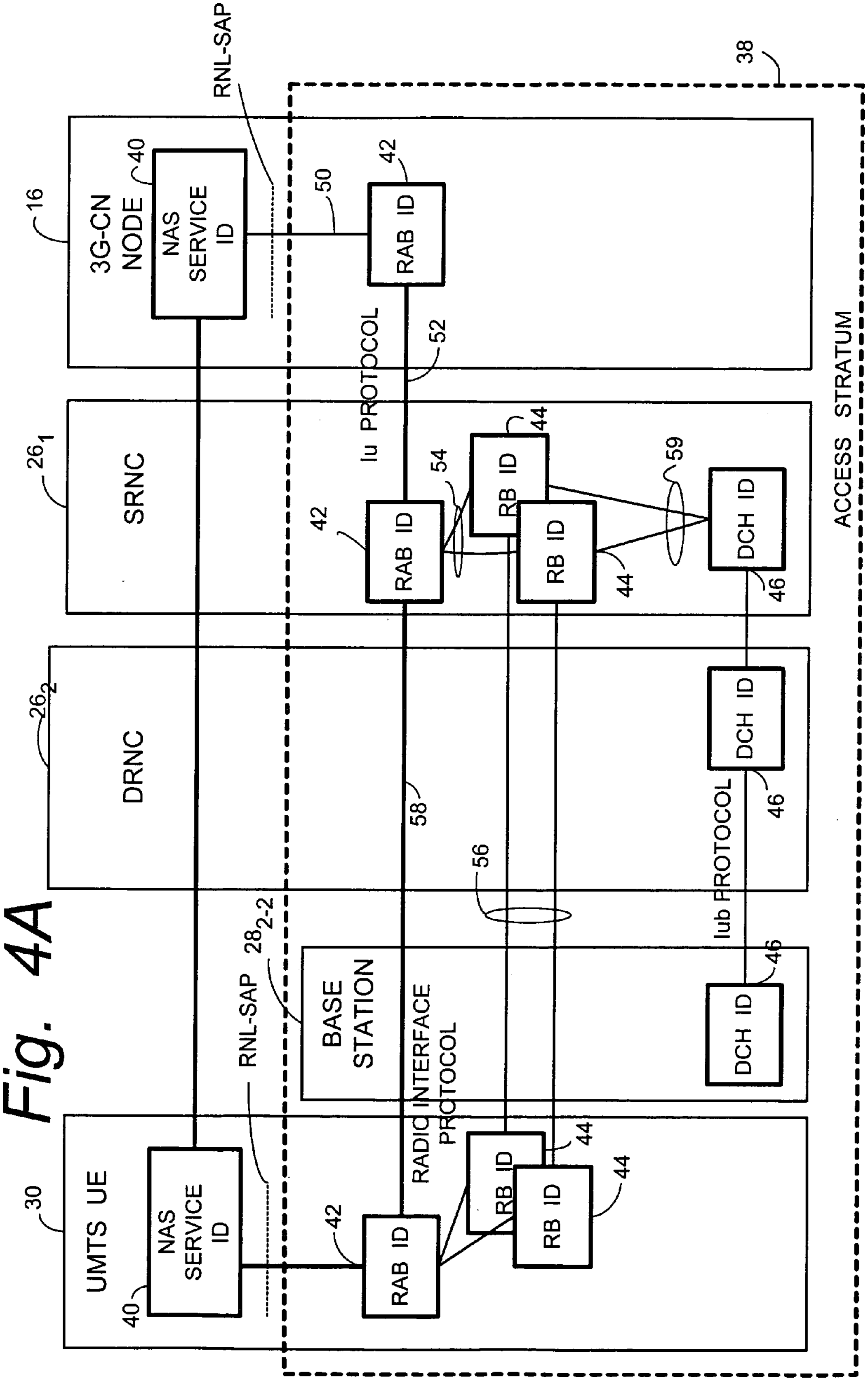
FIG. 4A is a diagrammatic view illustrating a relation between various identifiers employed in a telecommunications connection prior to performance of an SRNC relocation procedure of the invention.

FIG. 4A shows an access stratum of the architecture of Universal Mobile Telecommunications (UMTS) 10 as being framed by broken line 38. A non-access stratum level of the UMTS architecture exists above the box framed by broken line 38. When a telecommunications service is utilized in the Universal Mobile Telecommunications (UMTS) 10, the service is identified on the non-access stratum level of the UMTS architecture by a NAS Service Identifier (NAS Service ID) 40. For example, the service can be a circuit switch (CS) service (e.g., a speech call) or a packet switch (PS) service. In this regard, the NAS Service ID can be the Stream ID for a circuit switch (CS) service or a NSAPI for a packet switch (PS) service. It is not necessarily germane to the present invention as to what type of service is being utilized, and herein with reference to the connection involving user equipment unit (UE) 30 the service is generically referenced as "the service".

On the access stratum level of the UMTS architecture, the service is identified by a radio access bearer (RAB) identifier (RAB ID) 42 on the Iu and radio interfaces and is accompanied by one or more radio bearer (RB) identifiers (RB IDs)

44 on the radio interface (e.g,. the air interface) identifying the radio bearers. During establishment of a UMTS service, at the core network the RAB ID is assigned the value of the NAS Service ID, thus creating a linking (illustrated by line 50 in FIG. 4A) between the RAB ID and the NAS Service ID. Using an Iu interface protocol, the RAB ID is passed over the Iu interface (as indicated by line 52 in FIG. 4A) to the Serving RNC (SRNC). The SRNC then decides how to map the radio access bearer (RAB) onto radio bearers (RBs). The mapping of the radio access bearer (RAB) onto radio bearers (RBs) is shown by lines 54 in FIG. 4A. When the SRNC establishes the radio bearers (RB) with the UE involved in the service, the SRNC passes the radio bearer (RB) Identities (RB IDs) identifying the radio bearers (RBs) to the user equipment unit (UE) (indicated by lines 56 in FIG. 4A). To create a linking between the NAS Service and the radio bearer at the user equipment unit (UE), the SRNC also passes the RAB ID together with the corresponding radio bearer (RB) identities (RB IDs) to the user equipment unit (UE) (as reflected by line 58 in FIG. 4A).

A Dedicated Transport Channel (DCH) for the service is identified by a DCH ID on the Iur and Iub interfaces. Such identification is performed by the serving RNC (SRNC) at the time the radio bearers are allocated. At the serving RNC (SRNC), one or more radio bearers (RBs) 44 are linked to one transport channel, e.g., to one Dedicated Transport Channel (DCH) 46 on the Iur, Iub, and radio interfaces. Such linking is shown by lines 59 in FIG. 4A. Each DCH can be carried by one or more physical channels.

However, the DCH ID used on the Iur and Iub interfaces is not used on the radio interface. Instead, a Transport Channel (TrCH) identifier is used over the radio interface to identify the transport channel on the radio interface. The serving RNC (SRNC) and the UE know this Transport Channel (TrCH) identifier (in the same way as they know the RB ID), but the Transport Channel (TrCH) identifier is not known to the DRNC or to the Base Station.

Thus, as shown in FIG. 4A, each NAS Service 40 is linked to one radio access bearer (RAB) 42, and each radio access bearer (RAB) 42 is linked to one or more radio bearers (RBs) 44. One or more radio bearers (RBs) 44 are linked to one transport channel, e.g., to one Dedicated Transport Channel (DCH) 46. Consequentially, each radio access bearer (RAB) 42 is linked to one or more DCHs 46, as shown in FIG. 4A.

In the event of a relocation of serving RNC (SRNC) from a first RNC to a second RNC for a particular service, the Third Generation Partnership Project (3GPP) proposes to signal from the first RNC (e.g., the old SRNC) to the second RNC (e.g., new SRNC) certain linking information, and specifically to signal information which links the radio access bearer (RAB) IDs and their radio bearer (RB) IDs. However, in accordance with this 3GPP proposal, the new SRNC must still guess which dedicated transport channels (DCHs) would correspond to the radio bearers utilized.

Figure 5A:
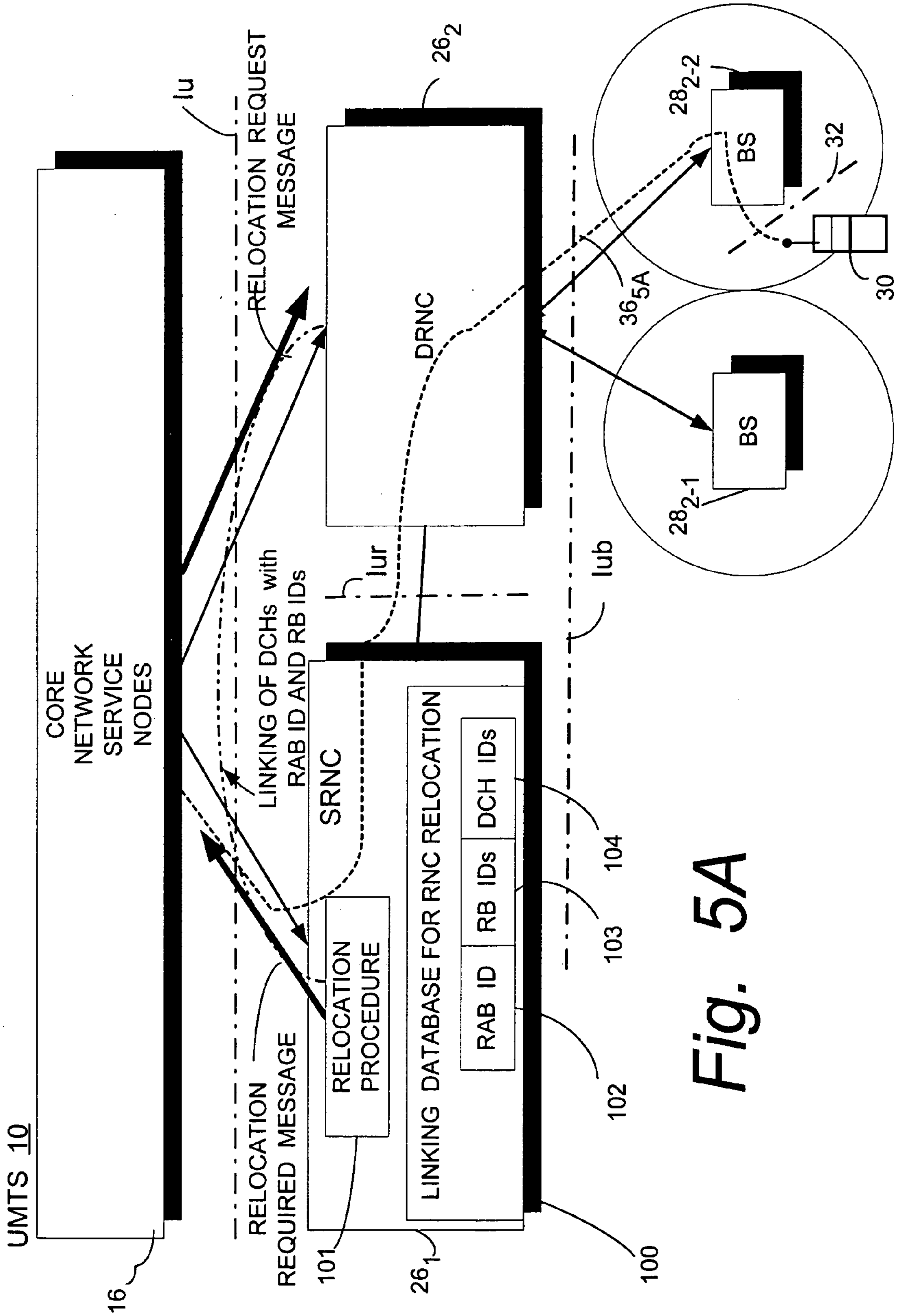
FIG. 5A and FIG. 5B are diagrammatic views illustrating an example SRNC relocation procedure without user equipment unit (UE) involvement in accordance with one mode of the invention.
Figure 5B:
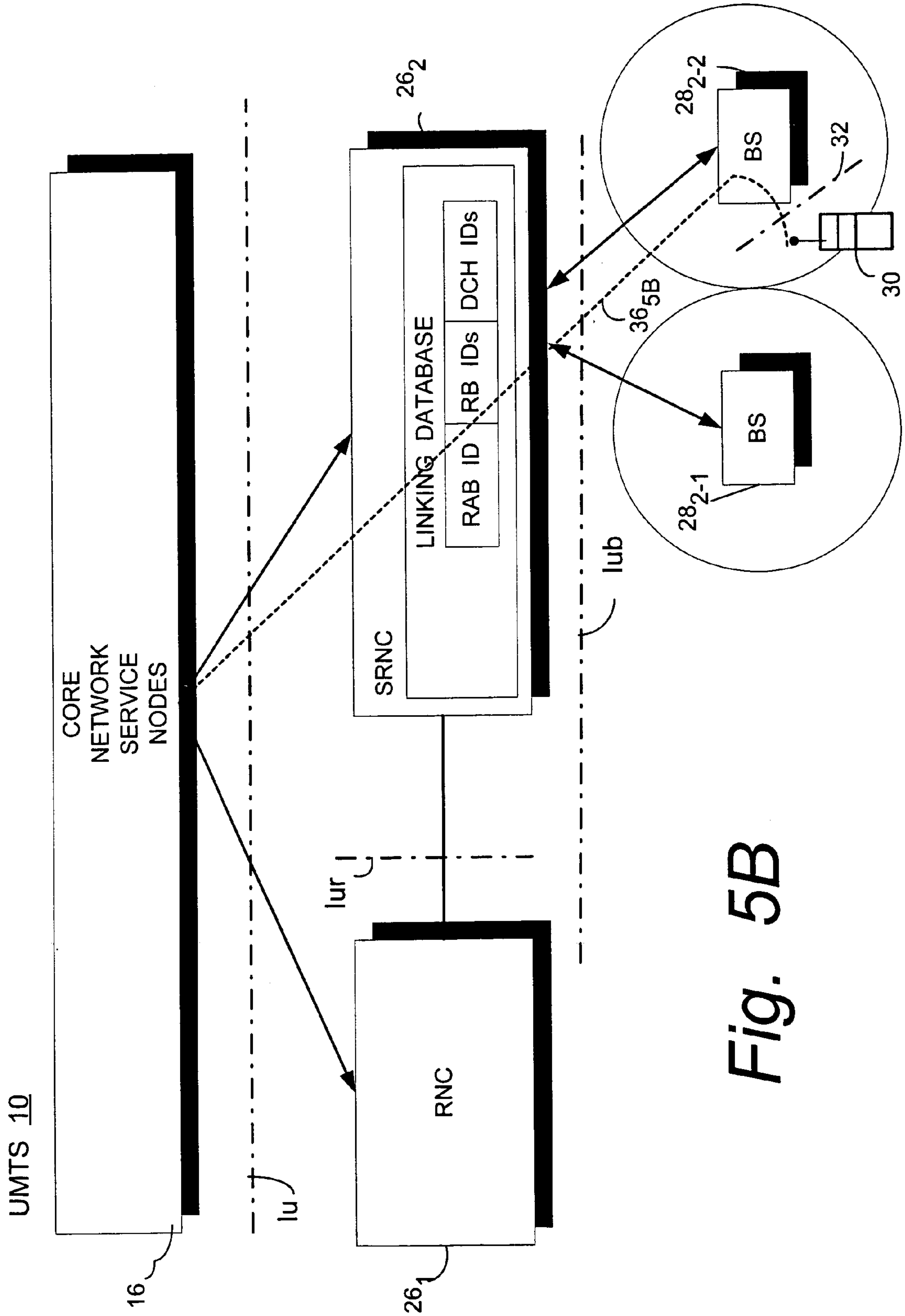

By contrast to the 3GPP proposal, in a first mode of the present invention illustrated in FIG. 5A and FIG. 5B, when relocation from a first RNC to a second RNC is to occur for a service, the first radio network controller also signals to the second radio network controller information for linking a dedicated transport channel (DCH) utilized for the service with a radio access bearer (RAB) for the service.

FIG. 5A and FIG. 5B show a UTRAN 10 with a radio access network configured to implement the first mode of the present invention. The radio network controller (RNC) $\mathbf{26}_1$ of the present invention includes a memory or the like, illustrated as data base 100, which associates the dedicated transport channel (DCH) IDs utilized for the service with a radio access bearer (RAB) for the service. For convenience and for emphasizing a particular use here relevant for the data stored in the data base 100, the data base is entitled the "linking database for RNC relocation", and (for short) "linking data base" 100. The linking data base 100 includes many fields or information elements for a particular service connection to a user equipment unit (UE), not all of which are necessarily illustrated in FIG. 5. FIG. 5 does show some fields of linking data base 100 which are pertinent to the present invention, it being understood that each of the fields of linking data base 100 are provided for each service connection to all user equipment units (UE) currently being served by radio network controller (RNC) $\mathbf{26}_1$.

The fields of linking data base 100 include radio access bearer (RAB) ID field 102; radio bearer (RA) field 103; and DCH ID field 104. The service is represented by the RAB ID field 102, which contains a value that is unique for the connection, such as the NAS Service ID previously mentioned. The radio access bearer (RAB) ID field 102 includes the radio access bearer (RAB) identifier (RAB ID) for the connection. The radio bearer (RB) field 103 includes the radio bearer (RB) identifiers (RB IDs) 44 for the connection. The DCH ID field 104 includes the identifiers for the Dedicated Transport Channels (DCHs) 46 utilized by the connection.

In accordance with the present invention, the serving RNC (SRNC) is provided with a relocation procedure 110 which implements the relocation of the serving RNC (SRNC) function from a first RNC to a second RNC. As described below particularly with reference to FIG. 5A and FIG. 5B, relocation procedure 110 facilitates transmission of linking information from a first RNC to a second RNC involved in an SRNC relocation operation.

The time shown in FIG. 5A is just before a relocation (without user equipment unit (UE) involvement) of the SRNC for user equipment unit (UE) 30, with user equipment unit (UE) 30 being in the cell served by base station (BS) $\mathbf{28}_{2\text{-}2}$ and the connection being illustrated by broken line $\mathbf{36}_{5A}$. The radio network controller (RNC) $\mathbf{26}_1$ determines that SRNC relocation for the service with user equipment unit (UE) 30 is desired or necessary, with the anticipated result that radio network controller (RNC) $\mathbf{26}_2$ (formerly the DRNC for user equipment unit (UE) 30) will become the new serving RNC (SRNC) for user equipment unit (UE) 30, replacing radio network controller (RNC) $\mathbf{26}_1$. Accordingly, the relocation procedure 110 of radio network controller (RNC) $\mathbf{26}_1$ prepares and sends a RELOCATION REQUIRED MESSAGE to the appropriate nodes in core network 16. For example, the RELOCATION REQUIRED MESSAGE can be sent both to a circuit switched control node (such as MSC node 18 in FIG. 1) and to a packet switched control node (such as SGSN node 20 in FIG. 1). The RELOCATION REQUIRED MESSAGE is discussed subsequently in connection with FIG. 7. The core network node then sends a RELOCATION REQUEST MESSAGE to radio network controller (RNC) $\mathbf{26}_2$. The RELOCATION REQUIRED MESSAGE and RELOCATION REQUEST MESSAGE together serve to transmit from radio network controller (RNC) $\mathbf{26}_1$ to radio network controller (RNC) $\mathbf{26}_2$ the information for the linking of the DCH IDs with the RAB IDs and RB IDs for the service connection to user equipment unit (UE) 30, as illustrated by the dashed/double-dotted line in FIG. 5A.

Figure 7:
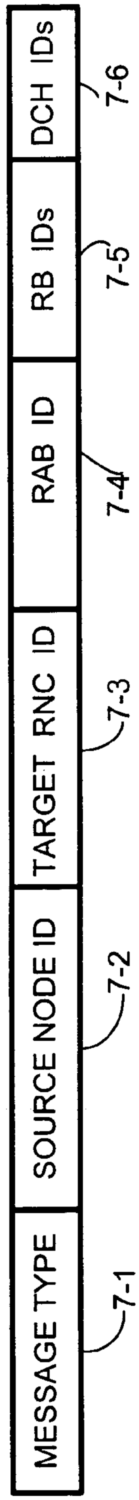
FIG. 7 is a diagrammatic view of an example format of a RELOCATION REQUIRED MESSAGE according to a first mode of the invention.

The RELOCATION REQUIRED MESSAGE is sent over the Iu interface in an appropriate protocol for the Iu interface. Example information elements of the RELOCATION REQUIRED MESSAGE which are pertinent to the present invention are illustrated in FIG. 7. Such information elements are illustrated in FIG. 7 as a message type information element 7-1; source node ID information element 7-2; target RNC node ID information element 7-3; RAB ID information element 7-4; RB ID information element 7-5, and DCH IDs information element 7-6. The message type information element 7-1 identifies the message as a RELOCATION REQUIRED MESSAGE. The source node ID information element 7-2, which identifies radio network controller (RNC) $\mathbf{26}_1$, is an optional information element not needed for the present invention, but which may be useful for gathering statistics, etc. The target RNC node ID information element 7-3 identifies the radio network controller (RNC) $\mathbf{26}_2$ to which the SRNC is to be relocated as a result of execution of the RNC relocation procedure. For the service connection for user equipment unit (UE) 30, the values contained in information elements 7-4 through 7-6 correspond to the information elements 102 through 104 of linking data base 100, respectively.

The RELOCATION REQUEST MESSAGE is sent from the core network node to radio network controller (RNC) $\mathbf{26}_2$, e.g., to the RNC which is to become the serving RNC (SRNC). The format of RELOCATION REQUEST MESSAGE, not specifically illustrated herein, basically differs from that of RELOCATION REQUIRED MESSAGE of FIG. 7 in that the target RNC ID information element 7-3 need not be included.

Figure 4B:
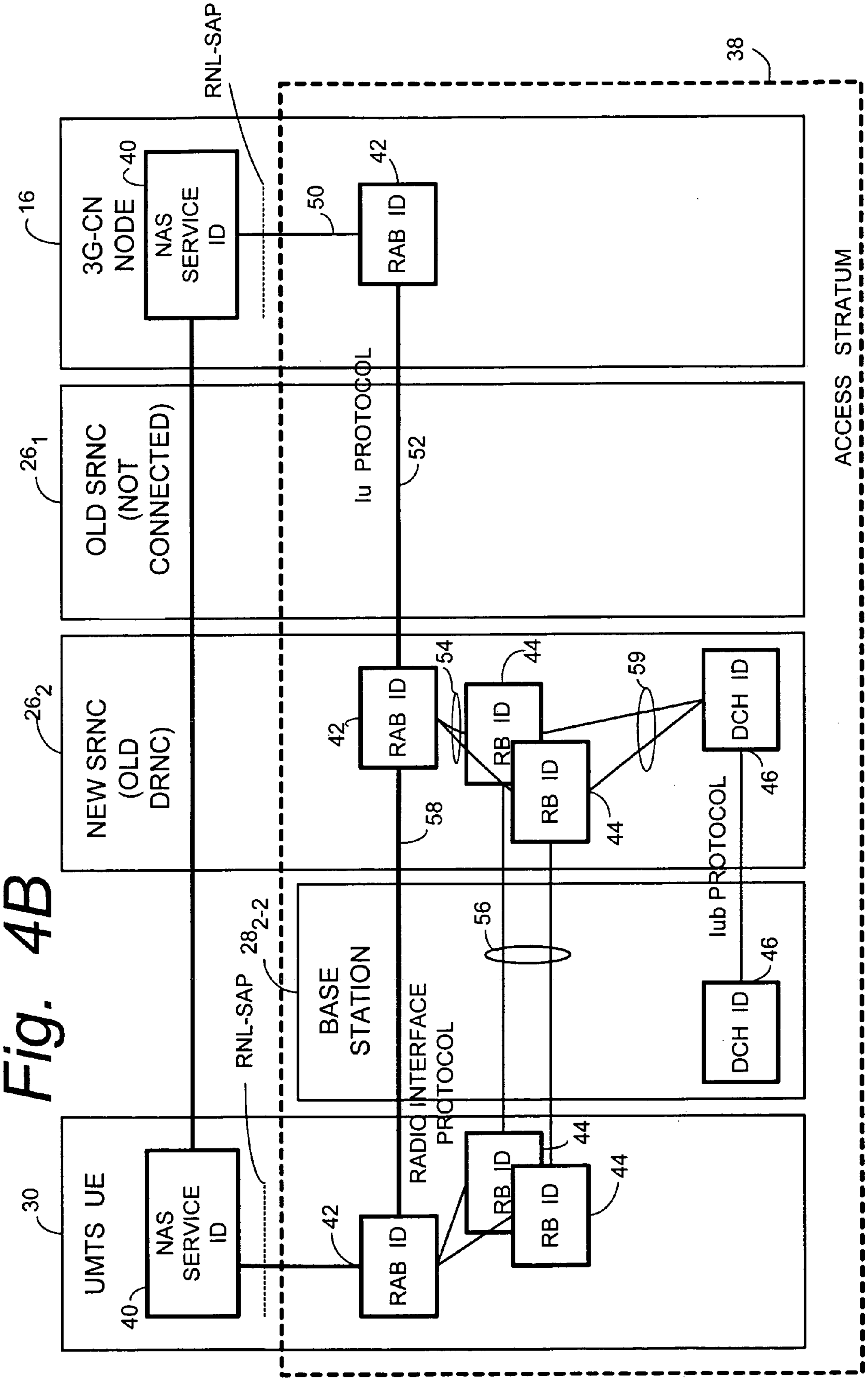
FIG. 4B is a diagrammatic view illustrating a relation between various identifiers employed in a telecommunications connection subsequent to performance of an SRNC relocation procedure according to a first mode of the invention.

Upon completion of the relocation procedure, and in view of reception of the RELOCATION REQUEST MESSAGE, radio network controller (RNC) $\mathbf{26}_2$ is able to perform the linking of identities in the manner shown in FIG. 4B. Both FIG. 5B and FIG. 4B illustrate that the serving RNC (SRNC) function has moved from radio network controller (RNC) $\mathbf{26}_1$ to radio network controller (RNC) $\mathbf{26}_2$, with the connection as illustrated by broken line $\mathbf{36}_{5B}$ in FIG. 5B. Advantageously, radio network controller (RNC) $\mathbf{26}_2$, upon becoming the serving RNC (SRNC), is provided (via RELOCATION REQUIRED MESSAGE and RELOCATION REQUEST MESSAGE) with information to link the radio bearer (RB) identifiers (RB IDs) 44 for the service with the same Dedicated Transport Channels (DCHs) 46 as utilized prior to the relocation. Thus, each radio access bearer (RAB) corresponds to one or more DCHs; each radio access bearer also corresponds to one or more radio bearers (RBs); and each DCH corresponds to one or more radio bearers (RBs). FIG. 4B illustrates by lines 59 the linking of Dedicated Transport Channels (DCHs) IDs 46 with radio bearer (RB) identifiers (RB IDs) 44.

Thus, in accordance with the relocation procedure 110 of the present invention, the target serving RNC (SRNC) (e.g., radio network controller (RNC) $\mathbf{26}_2$ in FIG. 5B) is able to re-create the linking to the same DCHs as previously utilized for user equipment unit (UE) 30. Such re-creation of the same DCH/RB linking is advantageous for many reasons. One such reason is that time and resources are not consumed in making another determination as to which DCHs should be utilized for user equipment unit (UE) 30 with respect to the service.

Figure 6:
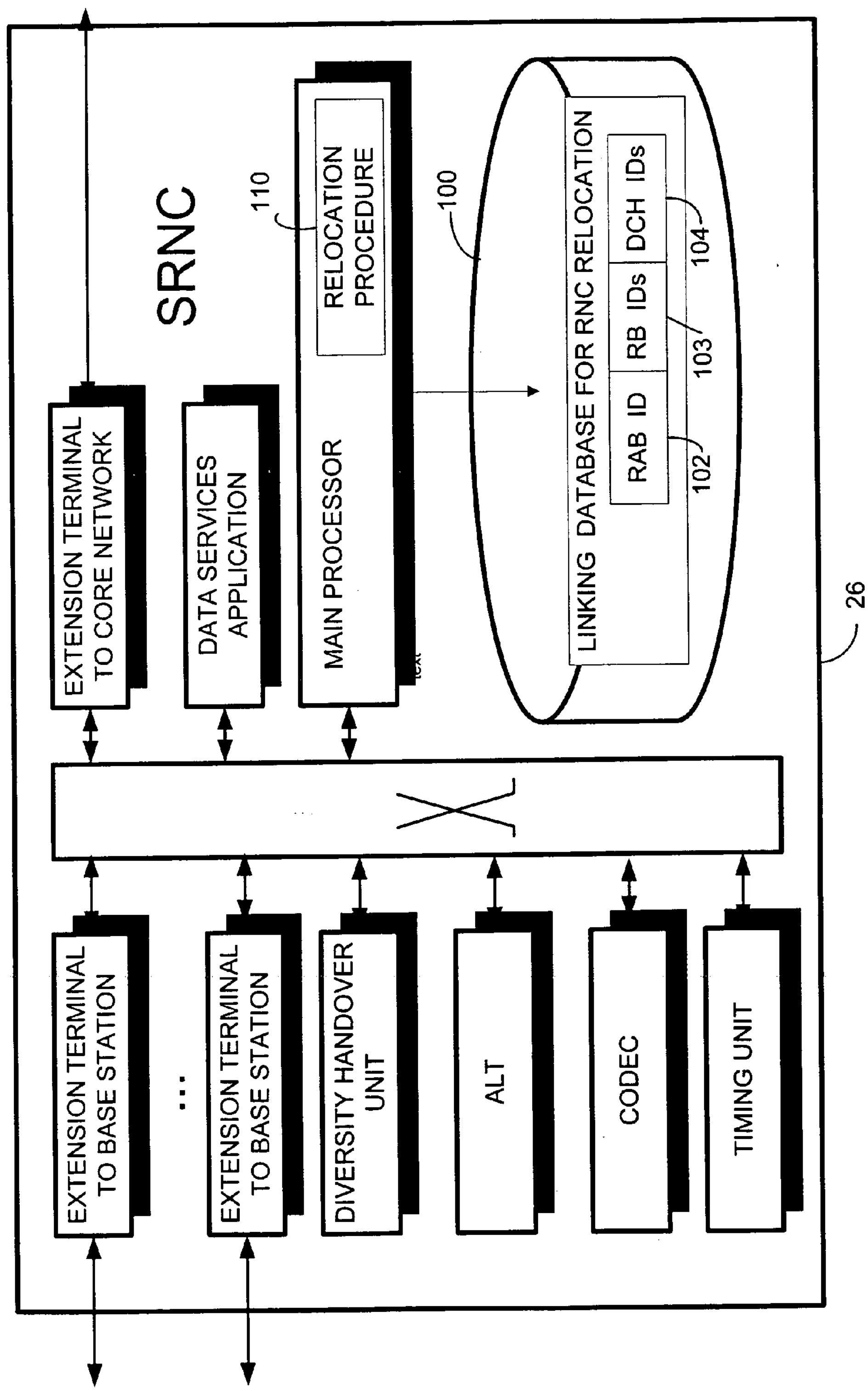
FIG. 6 is a schematic view of an example RNC node in accordance with one embodiment of the invention.

FIG. 6 illustrates, in somewhat more detail, an example RNC node 26 at which the relocation procedure 110 and linking data base 100 of the present invention can be located. It so happens that the RNC node 26 of FIG. 6 is a switched-based node having a switch 120. The switch 120 serves to interconnect other constituent elements of RNC node 26. Such other constituent elements include extension terminals $\mathbf{122}_1$ through $\mathbf{122}_n$, as well as extension terminal 124. Extension terminals $\mathbf{122}_1$ through $\mathbf{122}_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; an ALT unit 128; codex 130; timing unit 132; a data services application unit 134; and, a main processor 140. The person skilled in the art will appreciate generally the functions of these constituent elements, it being noted that the ALT unit 128 is a unit which provides, e.g., multiplexing and demultiplexing and (optionally) queueing with regard to differing protocols of cells.

In the embodiment of RNC node 26 as described in FIG. 6, it is main processor 140 which executes relocation procedure 110. Further, main processor 140 is connected to linking data base 100 for obtaining the linking information therefrom which is utilized by relocation procedure 110 to prepare the RELOCATION REQUIRED MESSAGE described with reference to FIG. 5A and FIG. 7.

The RNC node 26 can be configured to transmit and receive packets or cells, such as ATM cells, for example. However, the specific configuration of RNC node 26 is not critical to the present invention, so long as RNC node 26 can perform the relocation procedure 110 herein described and variations thereof.

As indicated above, on the radio interface (e.g., air interface), a Dedicated Transport Channel (DCH) is identified by two Transport Channel (TrCH) IDs on the downlink (i.e., from the SRNC to the user equipment unit (UE)) and one Transport Channel (TrCH) ID on the uplink (i.e., from the user equipment unit (UE) to the SNRC). As explained before, e.g., with reference to FIG. 4A, when the serving RNC (SRNC) establishes the radio bearer with the user equipment unit (UE), the serving RNC (SRNC) also passes the radio bearer (RB) identifiers (RB IDs) 44 to the user equipment unit (UE).

The Third Generation Partnership Project (3GPP) also proposes, for a relocation, to signal (from the first RNC (e.g., the old SRNC) to the second RNC (e.g., new SRNC)), for each radio access bearer (RAB) ID, the corresponding radio bearer (RB) IDs (one or more), and the corresponding uplink and downlink TrCH IDs. However, in accordance with this 3GPP proposal, the new SRNC must still guess which dedicated transport channels (DCHs) would correspond to a set of uplink and downlink TrCH IDs based, e.g., on the characteristics of the radio bearers. Thus, except under some special conditions, it is not possible with the 3GPP proposal to re-create the linking to the DCHs in the new SRNC.

Figure 8A:
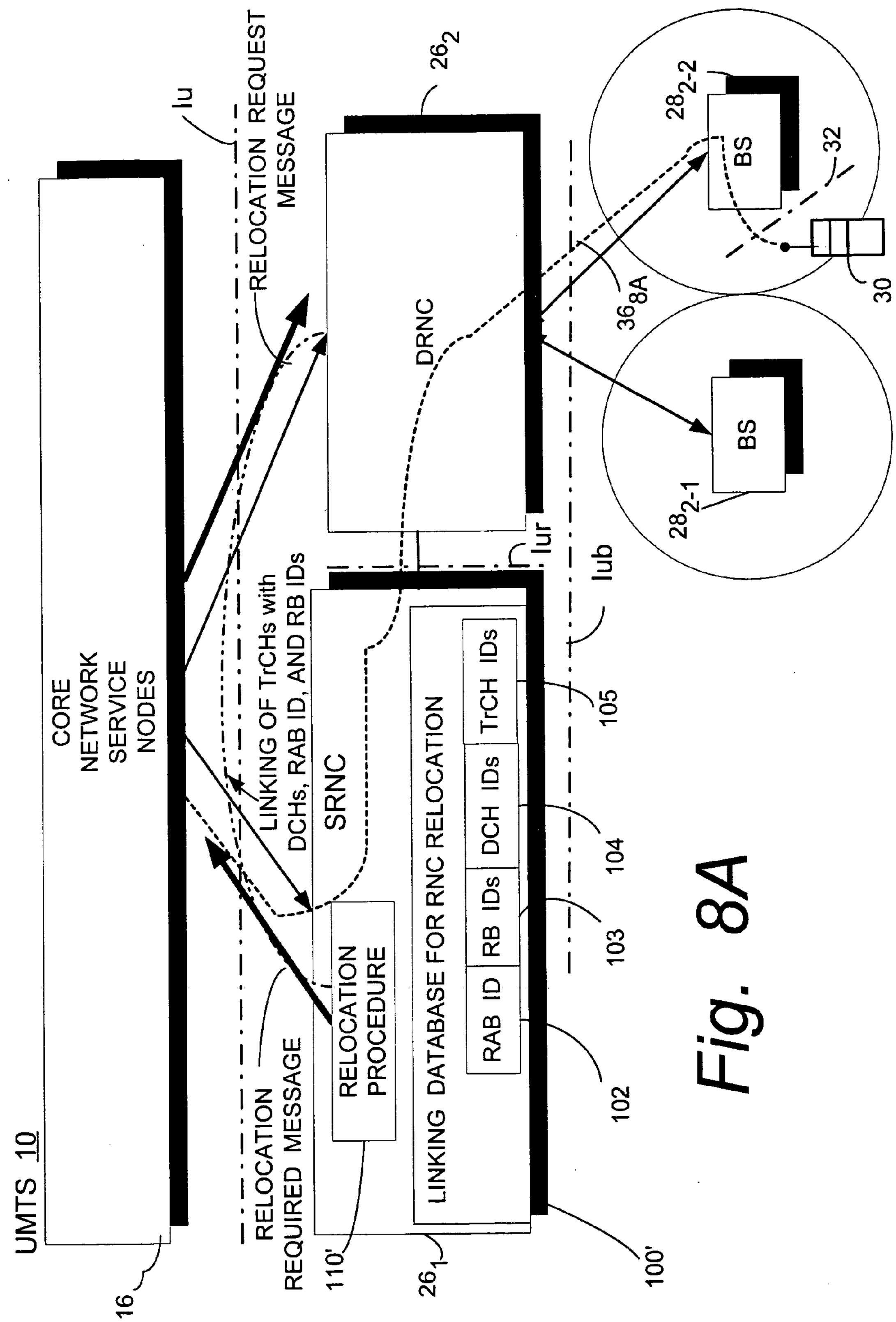
FIG. 8A and FIG. 8B are diagrammatic views illustrating an example SRNC relocation procedure without user equipment unit (UE) involvement in accordance with a second mode of the invention.
Figure 8B:
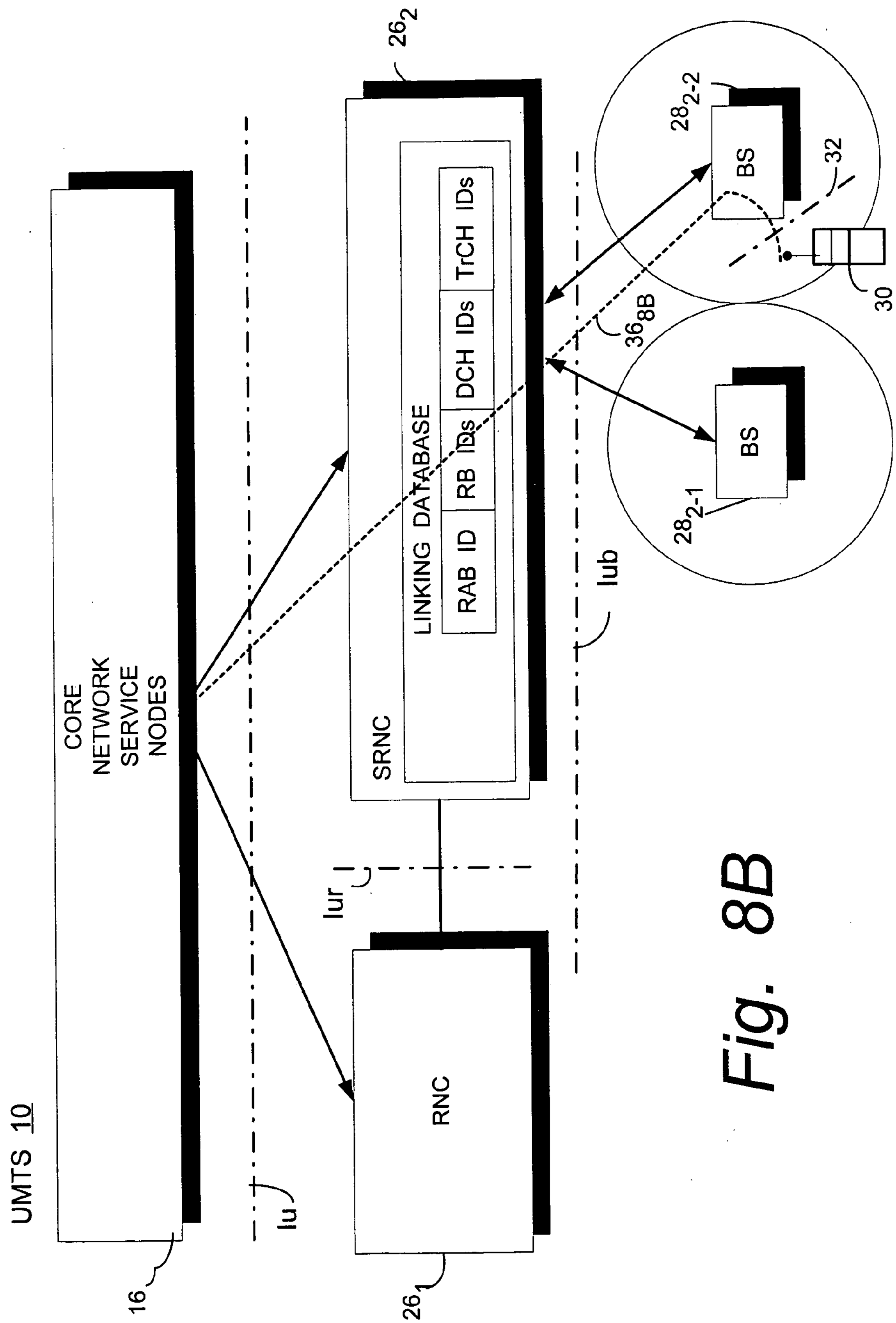
Figure 9A:
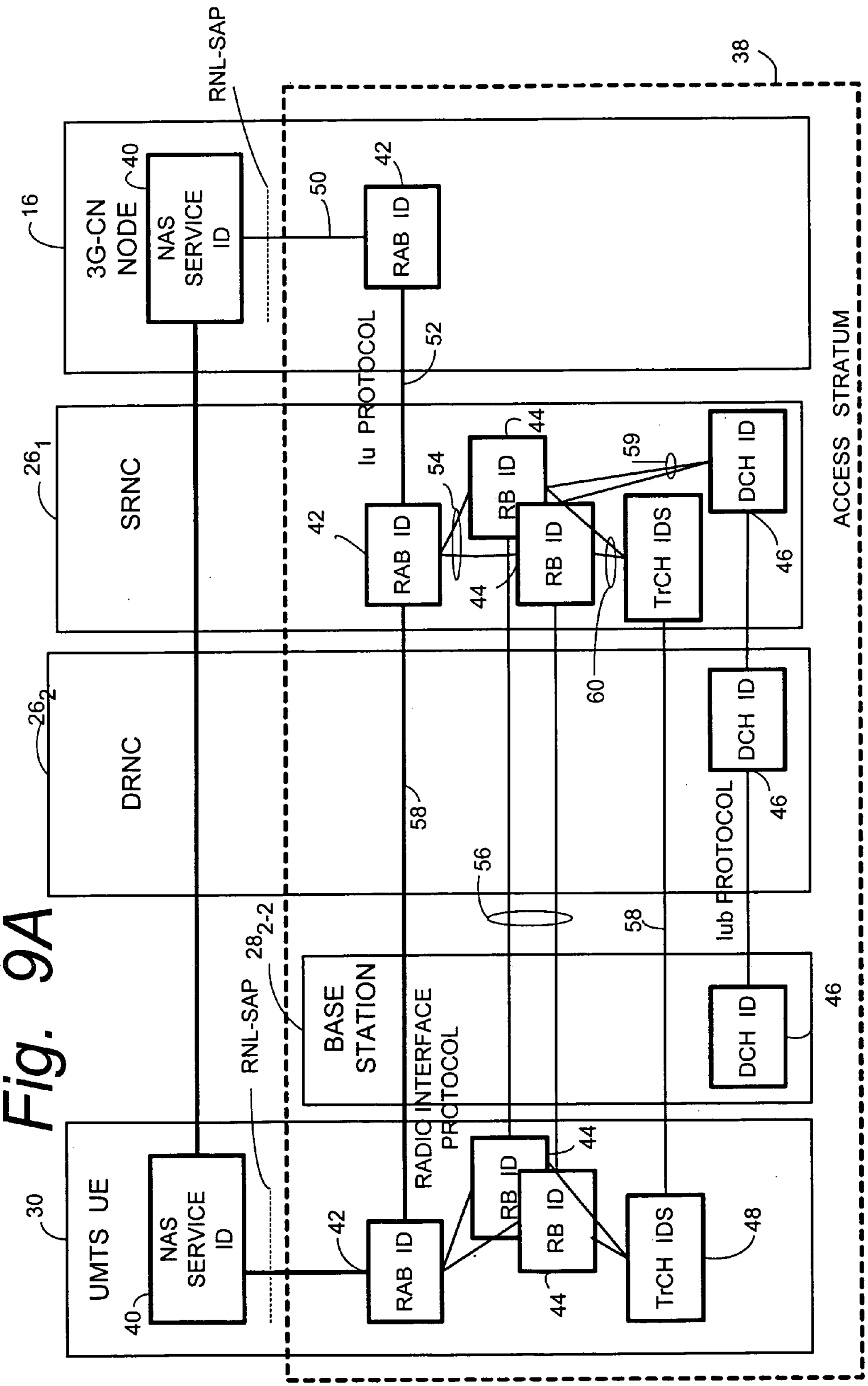
FIG. 9A is a diagrammatic view illustrating a relation between various identifiers employed in a telecommunications connection prior to performance of an SRNC relocation procedure according to the second mode of the invention.
Figure 9B:
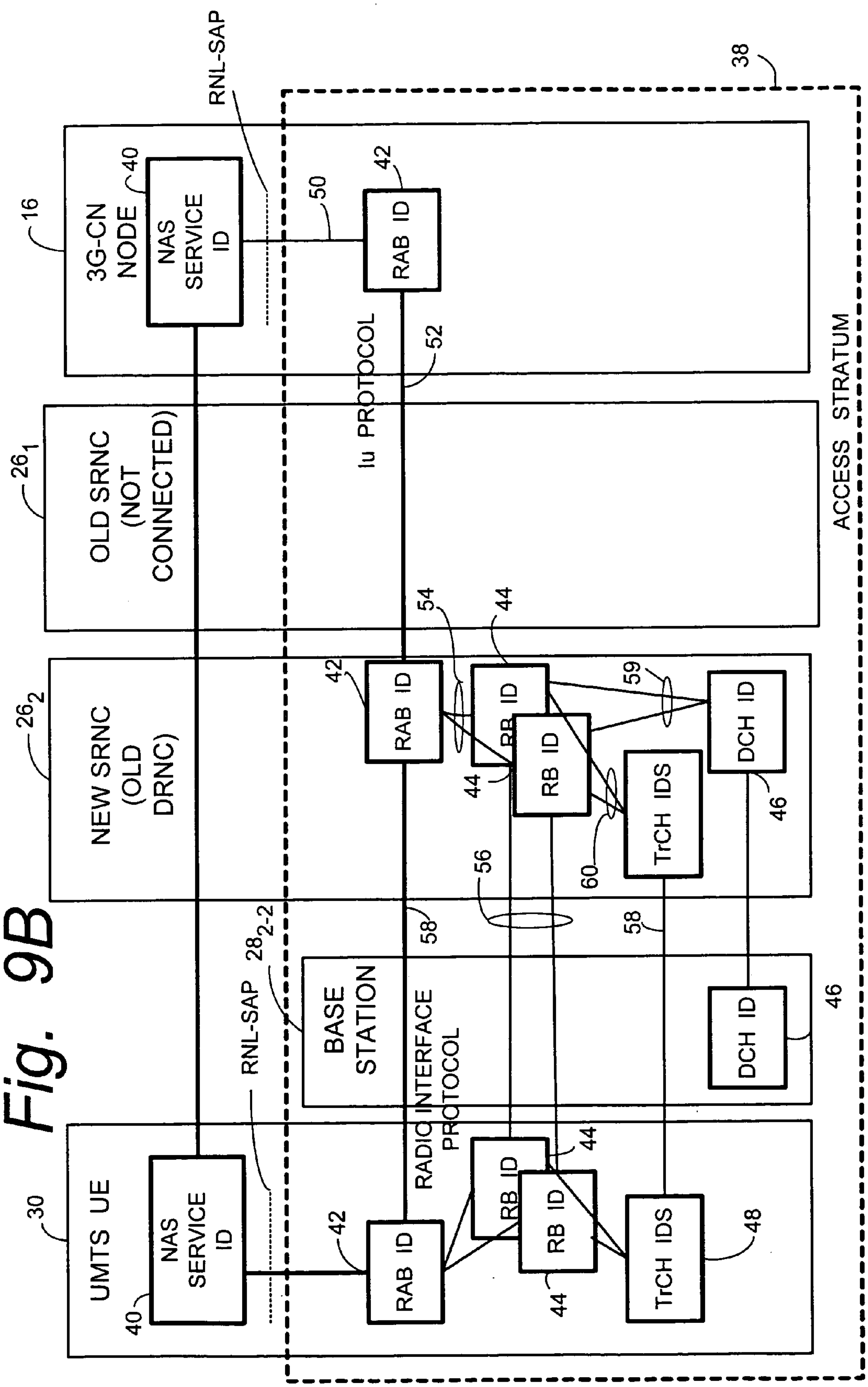
FIG. 9B is a diagrammatic view illustrating a relation between various identifiers employed in a telecommunications connection subsequent to performance of an SRNC relocation procedure according to the second mode of the invention.

By contrast to the 3GPP proposal, a second mode of the invention, which involves a linking of TrCH IDs with the radio access bearer (RAB) identifier during a serving RNC (SRNC) relocation procedure, is illustrated in FIG. 8A and FIG. 8B, together with FIG. 9A and FIG. 9B. FIG. 8A and FIG. 9A show that the second mode of the invention differs from the first mode by taking into consideration the TrCHs involved in the service for user equipment unit (UE) 30. In this regard, the relocation procedure 110' of the second mode and the linking data base 100' of the second mode are configured so that the signaling from radio network controller (RNC) $\mathbf{26}_1$ to radio network controller (RNC) $\mathbf{26}_2$ for a RNC relocation procedure provides a linking of TrCH IDs with DCH IDs, RAB IDs, and RB IDs, as indicated by the dashed/double-dotted line in FIG. 8A.

In the second mode of the invention, FIG. 9A differs from FIG. 4A by further taking into consideration the TrCHs. In particular, in the scheme of FIG. 9A lines 60 illustrate the linking of TrCH IDs 48 with radio bearer (RB) identifiers (RB IDs) 44. Further, FIG. 9A shows by lines 62 the serving RNC (SRNC) further passing the uplink and downlink TrCH IDs identifying each DCH to the user equipment unit (UE).

Reflecting the linking of FIG. 9A, linking data base 100' is provided with an additional field 105 which stores the two Transport Channel (TrCH) IDs on the downlink and the Transport Channel (TrCH) ID on the uplink which are utilized by user equipment unit (UE) 30 for the service. With the TrCH IDs field 105 being included in linking data base 100', relocation procedure 110 (being executed at radio network controller (RNC) $\mathbf{26}_1$) prepares and sends the RELOCATION REQUIRED MESSAGE of FIG. 10 to the core network, which in turn sends the RELOCATION REQUEST MESSAGE to radio network controller (RNC) $\mathbf{26}_2$.

Figure 10:
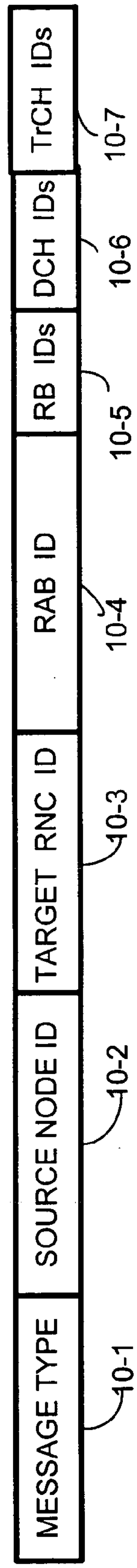
FIG. 10 is a diagrammatic view of an example format of a RELOCATION REQUIRED MESSAGE according to a second mode of the invention.

The RELOCATION REQUIRED MESSAGE of FIG. 10 has essentially the same format as that of FIG. 7, with the addition of a further information element 10-8 which contains the TrCH IDs which were being utilized by user equipment unit (UE) 30 prior to the serving RNC (SRNC) relocation, thereby enabling radio network controller (RNC) $\mathbf{26}_2$ to use these same TrCH IDs after the serving RNC (SRNC) relocation. It will be understood, with respect to both the format of FIG. 7 and the format of FIG. 10, that the order of the information elements included in these messages is not critical, and that numerous variations in format can be realized.

FIG. 8B and FIG. 9B depict the situation after the SRNC relocation procedure of the second mode has been performed. Broken line $\mathbf{36}_{8B}$ in FIG. 8B shows the connection for user equipment unit (UE) 30 after the SRNC relocation procedure has been performed. In this second mode, a linking of the uplink and downlink TrCH IDs for all DCH IDs of the Dedicated Transport Channels (DCHs) supporting a certain radio access bearer (RAB) identifier (RAB ID) 42 is provided for the new or target SRNC during establishment of the DCH over the Iur interface.

Figure 12:
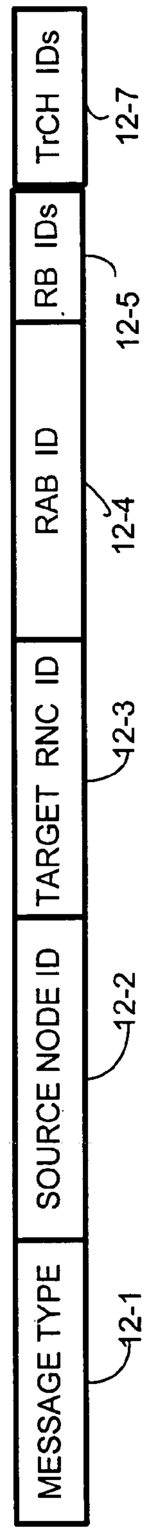
FIG. 12 is a diagrammatic view of an example format of a RELOCATION REQUIRED MESSAGE according to a third mode of the invention.
Figure 11:
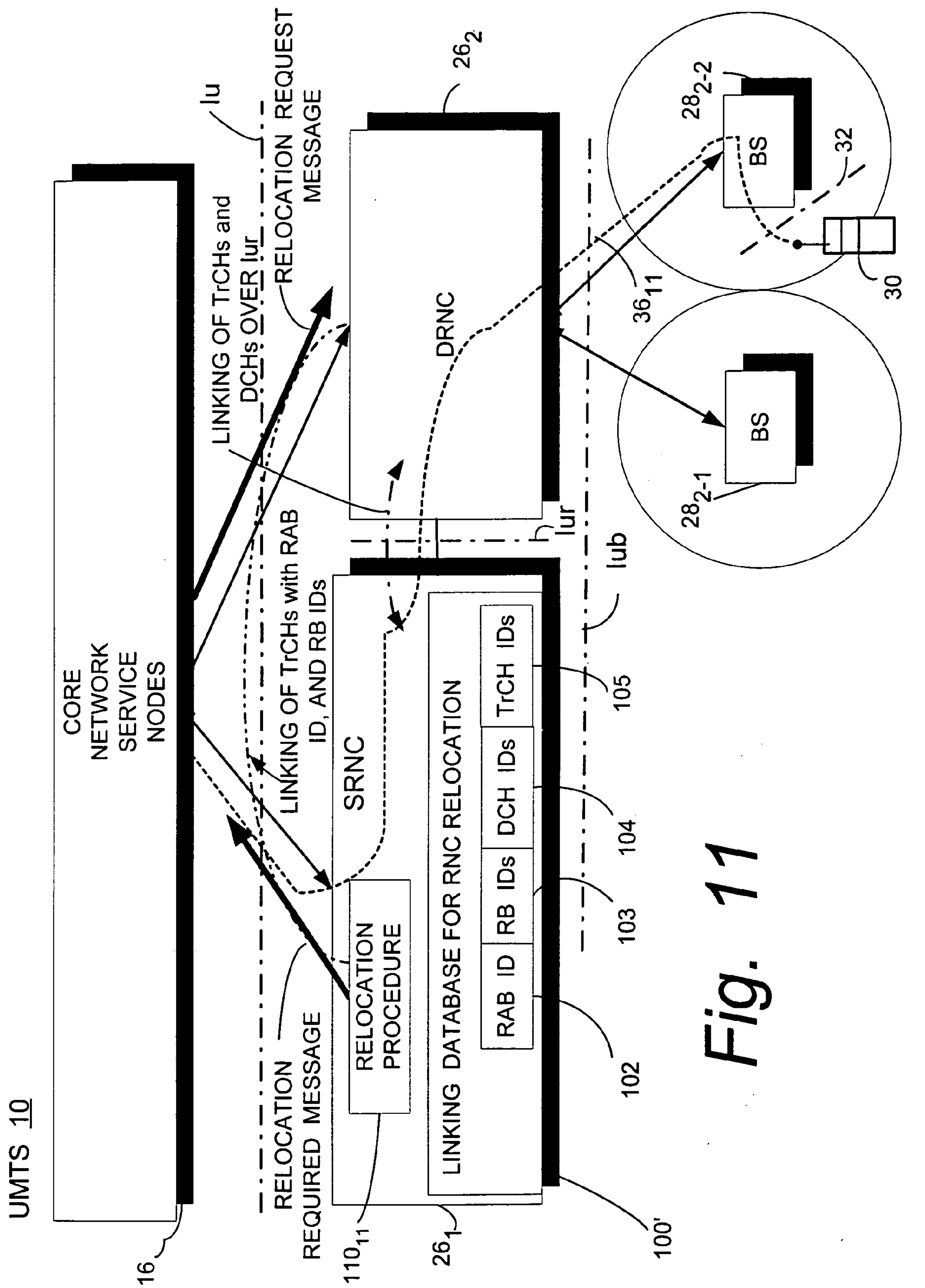
FIG. 11 is a diagrammatic view illustrating an example SRNC relocation procedure without user equipment unit (UE) involvement in accordance with a third mode of the invention.

FIG. 11 shows a third mode of the invention, which is a variation on the second mode of FIG. 8A and FIG. 8B. In essence, FIG. 11 shows a relocation procedure $\mathbf{110}_{11}$ which, like the relocation procedure 110' of FIG. 8A, sends the RELOCATION REQUIRED MESSAGE of FIG. 12 to appropriate nodes of the core network. However, unlike the RELOCATION REQUIRED MESSAGE issued by relocation procedure 110', the relocation procedure $\mathbf{110}_{11}$ of the third mode does not include the Dedicated Channels (DCHs) in RELOCATION REQUIRED MESSAGE of FIG. 12. Omission of the DCH IDs in RELOCATION REQUIRED MESSAGE of FIG. 12 is feasible in view of the fact that a linking of TrCH IDs and DCH IDs occurs between radio network controller (RNC) $\mathbf{26}_1$ and radio network controller (RNC) $\mathbf{26}_1$ by transmissions over the Iur interface prior to the relocation procedure $\mathbf{110}_{11}$ (as shown by another dashed/double-dotted line in FIG. 11). After completion of the relocation procedure $\mathbf{110}_{11}$ of the third embodiment of FIG. 11, the result is similar to that shown in FIG. 8B and FIG. 9B.

In the third mode of the invention, certain messages over the Iur interface would preferably include an association of the DCH IDs with their corresponding uplink and downlink TrCH IDs. These messages are the RADIO LINK SETUP REQUEST MESSAGE; the RADIO LINK RECONFIGURATION PREPARE MESSAGE; and the RADIO LINK RECONFIGURATION REQUEST MESSAGE.

Figure 13:
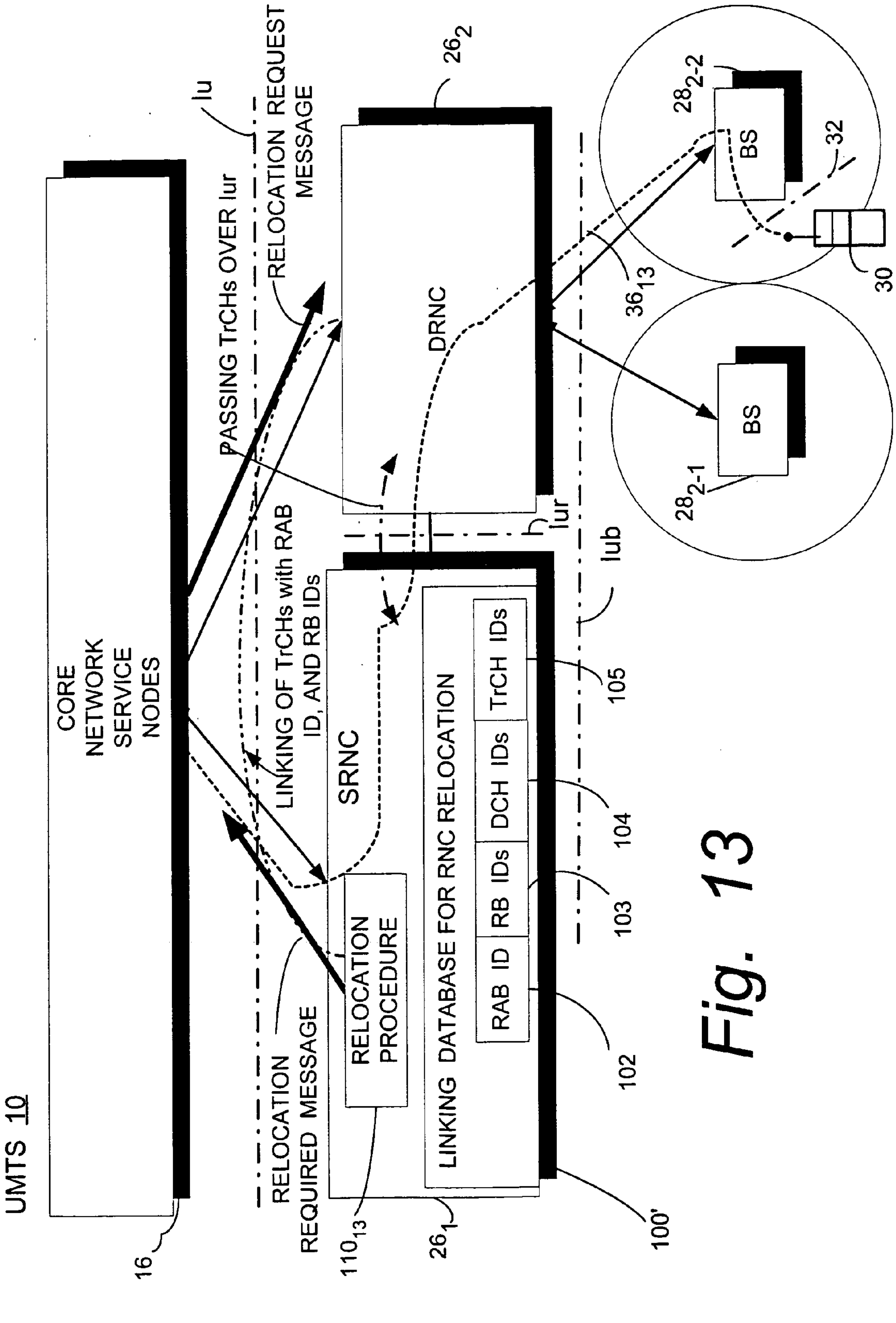
FIG. 13 is a diagrammatic view illustrating an example SRNC relocation procedure without user equipment unit (UE) involvement in accordance with a fourth mode of the invention.

FIG. 13 shows a fourth mode of the invention which is a variation on the third mode of FIG. 11. In the relocation procedure $\mathbf{110}_{12}$ of the fourth mode, the Dedicated Transport Channel (DCH) IDs are not signaled or transmitted at all in connection with the SRNC relocation. Instead in the fourth mode the Dedicated Transport Channels (DCHs) are identified by the uplink and downlink TrCH IDs on the Iur as well as on the radio interface and optionally on the Iub interface. In the fourth mode, the target RNC (e.g., the new SRNC) thus already knows the uplink and downlink TrCH IDs identifying the Dedicated Transport Channels (DCHs) relocation procedure $\mathbf{110}_{12}$. In this regard, in the fourth mode the uplink and downlink TrCH IDs are communicated to target RNC over the Iur interface. Therefore, in this fourth mode it is not necessary to pass the Dedicated Transport Channel (DCH) IDs in the RELOCATION REQUIRED MESSAGE or in the RELOCATION REQUEST MESSAGE, or across the Iur interface between radio network controller (RNC) $\mathbf{26}_1$ and radio network controller (RNC) $\mathbf{26}_2$.

Linking is created in the following way:

(A) On the Iur interface, prior to the relocation, the RNCs exchange the DCHs IDs. In the fourth mode it is the uplink and downlink TrCH IDs that are exchanged by the RNCs. The DCH ID in the first to third modes is thus replaced by the uplink and downlink TrCH IDs.

(B) On the Iu interface, at relocation the linking between the RAB ID and its corresponding uplink and downlink TrCH IDs is provided to the target RNC.

(C) The target RNC can thus link the RAB to the DCH using the TrCH IDs provided firstly over Iur and secondly over Iu at relocation.

After completion of the relocation procedure $\mathbf{110}_{13}$ of the fourth embodiment of FIG. 13, the result is similar to that shown in FIG. 8B and FIG. 9B.

Thus, in the fourth mode of the invention, the relocation procedure $\mathbf{110}_{13}$ does not require the DCH IDs in the RELOCATION REQUIRED MESSAGE and RELOCATION REQUEST MESSAGE. In the fourth mode of the invention, certain messages over the Iur interface and optionally over the Iub interface would preferably include the uplink and downlink TrCH IDs as identifiers of a Dedicated Transport Channel (DCH) rather than using the DCH IDs. In the fourth mode of the invention the Dedicated Transport Channels would thus be identified by the uplink and downlink TrCH IDs on the Iur as well as on the radio interface and optionally on Iub interfaces. These messages are the RADIO LINK SETUP REQUEST MESSAGE; the RADIO LINK SETUP RESPONSE MESSAGE; the RADIO LINK SETUP FAILURE MESSAGE; the RADIO LINK ADDITION RESPONSE MESSAGE; the RADIO LINK ADDITION FAILURE MESSAGE; the RADIO LINK RECONFIGURATION PREPARE MESSAGE; the RADIO LINK RECONFIGURATION READY MESSAGE; RADIO LINK RECONFIGURATION REQUEST MESSAGE; and the RADIO LINK RECONFIGURATION RESPONSE MESSAGE.

The invention is independent of the core network architecture. Moreover, although the invention has particular applicability to SRNC relocation without user equipment unit (UE) involvement, the invention also has advantages in situations involving SRNC location with user equipment unit (UE) involvement. In this regard, the relocation can be performed with an objective to optimize transmission by moving the role of the serving RNC (SRNC) to an RNC currently being the DRNC. In this case, the relocation could be performed also with user equipment unit (UE) involvement and thus include a possible change in DCHs, but in such case it may not be necessary to link the radio access bearer (RAB) identifiers (RAB IDs) to the old DCHs.

While the invention has been described in connection with what is presently considered to be the most practical and preferred embodiments and modes, it is to be understood that the invention is not to be limited to the disclosed modes and embodiments, but on the contrary, is intended to cover various modifications and equivalent arrangements included within the spirit and scope of the appended claims.

What is claimed is:

1. A method of performing, for a telecommunications service, relocation of a role of a serving radio network controller (SRNC) from a first radio network controller (RNC) to a second radio network controller (RNC), wherein for the service for which the relocation occurs the first radio network controller signals to the second radio network controller information for linking a transport channel utilized for the service with a radio access bearer (RAB) for the service and wherein after the relocation the radio access bearer for the service is linked by the second radio network controller to a same transport channel as was utilized by the first radio network controller for the service prior to the relocation.

2. The method of claim 1, further comprising the first radio network controller signaling to the second radio network controller information for linking a radio bearer (RB) utilized for the service with a radio access bearer (RAB) for the service.

3. The method of claim 1, further comprising signaling the information for linking the transport channel utilized for the service with a radio access bearer (RAB) for the service at a time when a user equipment unit (UE) involved in the service is not changing cells.

4. The method of claim 1, wherein the signaling from the first radio network controller to the second radio network controller occurs via a core network.

5. The method of claim 1, wherein the transport channel utilized for the service is a dedicated transport channel (DCH).

6. The method of claim 1, wherein the first radio network controller signals to the second radio network controller information for linking uplink and downlink transport channels (TrCHs) utilized for the service with a radio access bearer (RAB) for the service.

7. The method of claim 1, further comprising the first radio network controller signaling to the second radio network controller information for linking both uplink and downlink transport channels (TrCHs) utilized for the service with a radio access bearer (RAB) for the service.

8. The method of claim 1, further comprising the first radio network controller signaling to the second radio network controller information for linking a radio bearer (RB) utilized for the service with a radio access bearer (RAB) for the service.

9. The method of claim 1, further comprising signaling the information for linking the transport channel (TrCH) utilized for the service with a radio access bearer (RAB) for the service at a time when a user equipment unit (UE) involved in the service is not changing cells.

10. The method of claim 1, wherein the signaling from the first radio network controller to the second radio network controller occurs via a core network.

11. The method of claim 1, further comprising signaling, to the second radio network controller (RNC), the information for linking a transport channel utilized for the service with a radio access bearer (RAB) for the service during a relocation procedure.

12. The method of claim 1, further comprising performing the signaling by including a transport channel identifier and a radio access bearer (RAB) in a message sent to a core network.

13. A radio access network which performs a serving radio network controller (SRNC) relocation procedure for a telecommunications service involving a user equipment unit (UE), the serving radio network controller (SRNC) relocation procedure functioning to relocate a role of a serving radio network controller (SRNC) from a first radio network controller (RNC) to a second radio network controller (RNC), wherein in accordance with the serving radio network controller (SRNC) relocation procedure the first radio network controller signals to the second radio network controller information for linking a transport channel utilized for the service with a radio access bearer (RAB) for the service, and wherein after the relocation the second radio network controller links the radio access bearer of the service to a same transport channel as was utilized by the first radio network controller for the service prior to the relocation.

14. The network of claim 13, wherein the first radio network controller further signals to the second radio network controller information for linking a radio bearer (RB) utilized for the service with a radio access bearer (RAB) for the service.

15. The network of claim 13, wherein the information for linking the transport channel utilized for the service with a radio access bearer (RAB) for the service is signaled at a time when a user equipment unit (UE) involved in the service is not changing cells.

16. The network of claim 13, wherein the signaling from the first radio network controller to the second radio network controller occurs via a core network.

17. The network of claim 13, wherein the transport channel utilized for the service is a dedicated transport channel (DCH).

18. The network of claim 13, wherein the first radio network controller signals to the second radio network controller information for linking uplink and downlink transport channels (TrCHs) utilized for the service with a radio access bearer (RAB) for the service.

19. The network of claim 13, wherein the information for linking the transport channel (TRCH) utilized for the service with a radio access bearer (RAB) for the service is signaled at a time when a user equipment unit (UE) involved in the service is not changing cells.

20. The network of claim 13, wherein the first radio network controller (RNC) signals the information for linking a transport channel utilized for the service with a radio access bearer (RAB) for the service to the second radio network controller (RNC), during a relocation procedure.

21. The network of claim 13, wherein the first radio network controller includes a transport channel identifier and a radio access bearer (RAB) identifier in a message sent to a core network.

22. A method of performing, for a telecommunications service, relocation of a role of a serving radio network controller (SRNC) from a first radio network controller (RNC) to a second radio network controller (RNC), the method comprising signaling, from the first radio network controller to the second radio network controller and during a relocation procedure, information for linking a transport channel utilized for the service with a radio access bearer (RAB) for the service by including a transport channel identifier and a radio access bearer (RAB) identifier in both a RELOCATION REQUIRED MESSAGE and a RELOCATION REQUEST MESSAGE.

23. The method of claim 22, further comprising performing the signaling by including a dedicated transport channel identifier (DCH ID) and the radio access bearer (RAB) identifier in both the RELOCATION REQUIRED MESSAGE and the RELOCATION REQUEST MESSAGE.

24. The method of claim 22, further comprising performing the signaling by including uplink and downlink transport channel identifiers (TrCH IDs) and the radio access bearer (RAB) identifier in both the RELOCATION REQUIRED MESSAGE and the RELOCATION REQUEST MESSAGE.

25. The method of claim 22, further comprising performing the signaling by including a dedicated transport channel identifier (DCH ID), uplink and downlink transport channel identifiers (TrCH IDs), and the radio access bearer (RAB) identifier in both the RELOCATION REQUIRED MESSAGE and the RELOCATION REQUEST MESSAGE.

26. The method of claim 22, further comprising:

transmitting over an Iur interface, prior to the relocation procedure, information for linking uplink and downlink transport channel identifiers (TrCH IDs) and a dedicated transport channel identifier (DCH ID);

signaling, during the relocation procedure, information for linking the uplink and downlink transport channel identifiers (TrCH IDs) with the radio access bearer (RAB) identifier.

27. The method of claim 26, wherein the step of signaling information for linking the uplink and downlink transport channel identifiers (TrCH IDs) with a radio access bearer (RAB) identifier involves including the uplink and downlink transport channel identifiers (TRCH IDs) and the the radio access bearer (RAB) identifier in both the RELOCATION REQUIRED MESSAGE and the RELOCATION REQUEST MESSAGE.

28. The method of claim 22, further comprising:

transmitting over an Iur interface, prior to the relocation procedure, the Iur interface the uplink and downlink transport channel identifiers (TrCH IDs) which identify the dedicated transport channel identifier (DCH ID);

signaling, during the relocation procedure, information for linking the uplink and downlink transport channel identifiers (TrCH IDs) with the radio access bearer (RAB) identifier.

29. The method of claim 28, wherein the step of signaling information for linking the uplink and downlink transport channel identifiers (TrCH IDs) with the radio access bearer (RAB) identifier involves including the uplink and downlink transport channel identifiers (TrCH IDs) and the radio access bearer (RAB) identifier in both the RELOCATION REQUIRED MESSAGE and the RELOCATION REQUEST MESSAGE.

30. A radio access network which performs a service radio network controller (SRNC) relocation procedure for a telecommunications service involving a user equipment unit (UE), the serving radio network controller (SRNC) relocation procedure functioning to relocate a role of a serving radio network controller (SRNC) from a first radio network controller (RNC) to a second radio network controller (RNC), wherein in accordance with the serving radio network controller (SRNC) relocation procedure the first radio network controller during the relocation procedure signals to the second radio network controller information for linking a transport channel utilized for the service with a radio access bearer (RAB) for the service by including a transport channel identifier and a radio access bearer (RAB) identifier in both a RELOCATION REQUIRED MESSAGE and a RELOCATION REQUEST MESSAGE.

31. The network of claim 30, wherein the first radio network controller includes a dedicated transport channel identifier (DCH ID) and the radio access bearer (RAB) identifier in both the RELOCATION REQUIRED MESSAGE and the RELOCATION REQUEST MESSAGE.

32. The network of claim 30, wherein the first radio network controller includes uplink and downlink transport channel identifiers (TrCH IDs) and the radio access bearer (RAB) identifier in both the RELOCATION REQUIRED MESSAGE and the RELOCATION REQUEST MESSAGE.

33. The network of claim 30, wherein the first radio network controller includes a dedicated transport channel identifier (DCH ID), uplink and downlink transport channel identifiers (TrCH IDs), and the radio access bearer (RAB) identifier in both the RELOCATION REQUIRED MESSAGE and the RELOCATION REQUEST MESSAGE.

34. The network of claim 30, further comprising:

the first radio network controller transmitting over an Iur interface, prior to the relocation procedure, information for linking uplink and downlink transport channel identifiers (TRCH IDs) and a dedicated transport channel identifier (DCH ID);

the first radio network controller signaling, during the relocation procedure, information for linking the uplink and downlink transport channel identifiers (TrCH IDs) with the radio access bearer (RAB) identifier.

35. The network of claim 34, wherein the first radio network controller links the uplink and downlink transport channel identifiers (TrCH IDs) with a radio access bearer (RAB) identifier by including the uplink and downlink transport channel identifiers (TrCH LDs) and the the radio access bearer (RAB) identifier in both the RELOCATION REQUIRED MESSAGE and the RELOCATION REQUEST MESSAGE.

36. The network of claim 30, further comprising:

the first radio network controller transmitting over an Iur interface, prior to the relocation procedure, the Iur interface the uplink and downlink transport channel identifiers (TrCH IDs) which identify the dedicated transport channel identifier (DCH ID);

the first radio network controller signaling, during the relocation procedure, information for linking the uplink and downlink transport channel identifiers (TrCH IDs) with the radio access bearer (RAB) identifier.

37. The network of claim 36, wherein the first radio network controller links the uplink and downlink transport channel identifiers (TrCH IDs) with the radio access bearer (RAB) identifier by including the uplink and downlink transport channel identifiers (TrCH IDs) and the the radio access bearer (RAB) identifier in both the RELOCATION REQUIRED MESSAGE and the RELOCATION REQUEST MESSAGE.

38. A method of performing, for a telecommunications service, relocation of a role of a serving radio network controller (SRNC) from a first radio network controller (RNC) to a second radio network controller (RNC), the method comprising:

the first radio network controller, for the service for which the relocation occurs, signaling to the second radio network controller information for linking a transport channel utilized for the service with a radio access bearer (RAB) for the service, wherein the transport channel has a channel identifier which is utilized on one of an Iub interface and a radio interface, the Iub interface being an interface between a radio network controller node and a base station node.

39. The method of claim 38, wherein the transport channel has a dedicated transport channel (DCH) identifier which is utilized on the Iub interface.

40. The method of claim 38, wherein the transport channel has uplink and downlink transport channel identifiers (TrCH IDs) which are utilized on the radio interface.

41. A radio access network which performs a serving radio network controller (SRNC) relocation procedure for a telecommunications service involving a user equipment unit (UE), the serving radio network controller (SRNC) relocation procedure functioning to relocate a role of a serving radio network controller (SRNC) from a first radio network controller (RNC) to a second radio network controller (RNC), wherein in accordance with the serving radio network controller (SRNC) relocation procedure the first radio network controller signals to the second radio network controller information for linking a transport channel utilized for the service with a radio access bearer for the service, wherein the transport channel has a channel identifier which is utilized on one of an Iub interface and a radio interface, the Iub interface being an interface between a radio network controller node and a base station node.

42. The network of claim 41, wherein the first radio network controller signals to the second radio network controller information for linking both uplink and downlink transport channels (TrCHs) utilized for the service with a radio access bearer (RAB) for the service.

43. The network of claim 41, wherein the transport channel has a dedicated transport channel (DCH) identifier which is utilized on the Iub interface.

44. The network of claim 41, wherein the transport channel has uplink and downlink transport channel identifiers (TRCH IDs) which are utilized on the radio interface interface.

45. A method of performing, for a telecommunications service, relocation of a role of a serving radio network controller (SRNC) from a first radio network controller (RNC) to a second radio network controller (RNC), the method comprising:

the first radio network controller, for the service for which the relocation occurs, signaling to the second radio network controller information for linking a transport channel utilized for the service with a radio access bearer (RAB) for the service, wherein the transport channel has a channel identifier which is utilized on one of an Iur interface and a radio interface, the Iur interface being an interface between the first radio network controller (RNC) and the second radio network controller (RNC).

46. The method of claim 45, wherein the transport channel has a dedicated transport channel (DCH) identifier which is utilized on the Iur interface.

47. The method of claim 45, wherein the transport channel has uplink and downlink transport channel identifiers (TrCH IDs) which are utilized on the radio interface.

48. A radio access network which performs a serving radio network controller (SRNC) relocation procedure for a telecommunications service involving a user equipment unit (UE), the serving radio network controller (SRNC) relocation procedure functioning to relocate a role of a serving radio network controller (SRNC) from a first radio network controller (RNC) to a second radio network controller (RNC), wherein in accordance with the serving radio network controller (SRNC) relocation procedure the first radio network controller signals to the second radio network controller information for linking a transport channel utilized for the service with a radio access bearer (RAB) for the service, wherein the transport channel has a channel identifier which is utilized on one of an Iur interface and a radio interface, the Iub interface being an interface between the first radio network controller (RNC) and the second radio network controller (RNC).

49. The network of claim 48, wherein the transport channel has a dedicated transport channel (DCH) identifier which is utilized on the Iur interface.

50. The network of claim 48, wherein the transport channel has uplink and downlink transport channel identifiers (TrCH IDs) which are utilized on the radio interface.

* * * * *